(12) United States Patent
Gabay

(10) Patent No.: US 10,740,728 B1
(45) Date of Patent: Aug. 11, 2020

(54) COMPUTER-BASED ACCESS SECURITY AND VERIFICATION

(71) Applicant: FreedomCare, LLC, Queens, NY (US)

(72) Inventor: Yoel Gabay, Flushing, NY (US)

(73) Assignee: INNOVATE CARE LLC, New Hyde Park, NY (US)

( * ) Notice: Subject to any disclaimer, the term of this patent is extended or adjusted under 35 U.S.C. 154(b) by 571 days.

(21) Appl. No.: 15/636,351

(22) Filed: Jun. 28, 2017

Related U.S. Application Data

(60) Provisional application No. 62/355,714, filed on Jun. 28, 2016.

(51) Int. Cl.
*G06Q 10/10* (2012.01)
*G06F 9/4401* (2018.01)
*H04L 9/32* (2006.01)

(52) U.S. Cl.
CPC ....... *G06Q 10/1091* (2013.01); *G06F 9/4406* (2013.01); *H04L 9/3247* (2013.01); *H04L 2463/121* (2013.01)

(58) Field of Classification Search
CPC .................................................. G06Q 10/1091
See application file for complete search history.

(56) References Cited

U.S. PATENT DOCUMENTS

| | | | |
|---|---|---|---|
| 2007/0274537 A1* | 11/2007 | Srinivasan | H04N 21/44222 381/94.3 |
| 2009/0251426 A1* | 10/2009 | Lee | G06F 3/0412 345/173 |
| 2009/0315835 A1* | 12/2009 | De Goes | G06F 3/0416 345/173 |
| 2014/0168094 A1* | 6/2014 | Milne | G09B 19/02 345/173 |
| 2016/0020909 A1* | 1/2016 | Gardenes Linan | G06Q 10/1091 713/175 |
| 2018/0081462 A1* | 3/2018 | Stevens | G06F 3/044 |
| 2018/0159973 A1* | 6/2018 | Chen | G06F 3/0488 |
| 2019/0354706 A1* | 11/2019 | Bartlett | G16H 10/60 |

\* cited by examiner

*Primary Examiner* — Scott A Zare
(74) *Attorney, Agent, or Firm* — Leason Ellis LLP

(57) ABSTRACT

Computer-based access security includes executing a system-level boot process, by a processor configured with a computing device, as a function of at least boot code, and storing, as a function of at least one operating system kernel, a value representing a time at or near completion of the system-level boot process. The security further includes receiving, as a function of a capacitive touch screen, an electrical charge operable to cause a measurable drop in voltage. Thereafter, the security includes generating, as a function of the measured voltage drop, an image. Moreover, the security includes storing the image to processor readable media configured with the computing device, wherein storing the image includes: determining a value representing an amount of time calculated from the time of completion of the system-level boot process; and associating the value representing the amount of time with the image.

20 Claims, 26 Drawing Sheets

COMPUTER-BASED ACCESS SECURITY AND VERIFICATION

CROSS-REFERENCE TO RELATED APPLICATIONS

This application is based on and claims priority to U.S. Provisional Patent Application Ser. No. 62/355,714, filed on Jun. 28, 2016, which is incorporated by reference as if expressly set forth in its entirety herein.

FIELD

The invention relates, generally, to security and metadata processing and, more specifically, to preventing fraud associated with attempts to falsify records.

BACKGROUND

The ability to confirm whether specific work services have been performed remains a challenge. Unscrupulous service providers have been known to falsify records, such as by forging signatures, and have been involved in efforts to be paid for work that was never completed.

Recently, consumer-directed homecare has increased, which has been helpful for consumers to direct their own care. For example, consumers and caregivers can work together to arrange for homecare, including with regard to scheduling work. Unfortunately, recording times and days worked by caregivers can be recorded and/or provided fraudulently. When undetected, timesheet fraud committed by home health care workers can result in billions of dollars of loss to insurance carriers and Medicaid. Such fraud is of utmost concern to many, including regulators, insurers, home health care providers and consumers.

BRIEF SUMMARY OF THE INVENTION

In one or more implementations, the present application includes systems and methods for computer-based access security. The security includes a) executing a system-level boot process, by a processor configured with a computing device, as a function of at least boot code stored on non-transitory read only memory configured with the computing device, and b) storing, by the processor as a function of at least one operating system kernel, a value representing a time at or near completion of the system-level boot process. Moreover, the security includes c) launching, by the processor following completion of the system-level boot process and in response to a received instruction via one or more input devices configured with the computing device, an application for tracking time expended for services. The security further includes d) receiving, as a function of a capacitive touch screen, an electrical charge operable to cause a measurable drop in voltage. Thereafter, the security includes e) generating, by the processor as a function of the measured voltage drop, an image that is displayed on a display screen configured with the computing device. Moreover, the security includes f) storing the image to processor readable media configured with the computing device, wherein storing the image includes: determining a value representing an amount of time calculated from the time of completion of the system-level boot process; and associating the value representing the amount of time with the image. The security further includes g) repeating steps d), e) and f), and h) determining, by the processor as a function of code executing in the application, a delta value representing a difference in time between each of the values representing the amount of time calculated from the time of completion of the system-level boot process. Moreover, the security includes i) where the delta between any two of the values representing the amount of time calculated from the time of completion exceeds a predefined threshold: generating and transmitting an alert representing a failed process. Alternatively, where the delta between any two of the values representing the amount of time calculated from the time of completion is within a predefined threshold, generating and transmitting a record representing at least the tracked time expended for the services.

In one or more other aspects of the security, the step d) is generated by a first person and the repeated step d) is generated by a different person.

In one or more other aspects of the security, the step e) image represents a respective signature from each of the two persons.

In one or more other aspects, the security includes detecting, as a function of the processor executing at least one instruction in the application, location services configured with the computing device, a geo-location, automatically transmitting to at least one other computing device, by the processor executing at least one instruction in the application, geo-location information representing the detected geo-location; and receiving from the at least one other computing device, in response to the transmitted geo-location information, a confirmation that the geo-location matches a stored location of a party to receive the services.

In one or more other aspects of the security, the value representing the amount of time is associated as a function of metadata.

In one or more other aspects, the security includes j) causing, by the processor as a function of at least one received instruction in the application, a camera configured with the computing device to take a picture; k) storing the picture to processor readable media configured with the computing device, wherein storing the picture includes: determining a value representing an amount of time calculated from the time of completion of the system-level boot process; and associating the value representing the amount of time with the picture; l) repeating steps h) and i), wherein the step i) includes the values set forth in steps k) and l).

In one or more other aspects of the security, the steps j) and k) are performed upon a determination that tracking the time expended for services regards the last day of a predefined week.

In one or more other aspects of the security, the picture taken in step j) is of a first person and the picture taken in the repeated step d) is of a different person.

In one or more other aspects of the security, the first person is a service provider and the second person is a service receiver.

In one or more other aspects of the security, the step f) and the repeated step f) of associating the value representing the amount of time with the image further comprises altering image to include the value representing the amount of time.

These and other aspects, features, and advantages can be appreciated from the accompanying description of certain embodiments of the invention and the accompanying drawing figures and claims.

DETAILED DESCRIPTION OF THE INVENTION

By way of overview and introduction, a system and method in accordance with one or more aspects of the present application are configured to provide improved security measures and metadata. The present application enables completion of a timesheet and to send it electronically to one or more devices. The present application provides security by layering a plurality of processes associated with receiving input from one or more devices to reduce and/or eliminate fraud associated with recording time associated with performed work, such as in connection with healthcare services. Moreover, the present application reduces overhead that would otherwise be needed for recording labor, such as via an electronic or paper timesheet.

In one or more implementations, the present application includes a plurality of modules that can be integrated in a distributed platform, such as a mobile software application executable on one or more computing devices. Such devices can include mobile computing devices, such as smartphones, that can operate to electronically verify that both a party providing and a party receiving services actually signed a timesheet for a provider, thus assisting to verify that the provider actually worked the hours indicated on the timesheet. As shown and described herein, the present application significantly reduces or completely eliminates the ability to forge a party's signature on a timesheet, such as by a provider of work services, and improves upon other flawed systems, such as phone-based timesheet systems, which can be inadequate for being prone to fraud and/or violate privacy laws or other concerns. Accordingly, the present application provides a labor recording system and method that electronically ensures that the respective services were performed, such as for a patient and by caregiver, by requiring that each is actually present at a time when respective signatures are entered on a timesheet.

Figure 1:
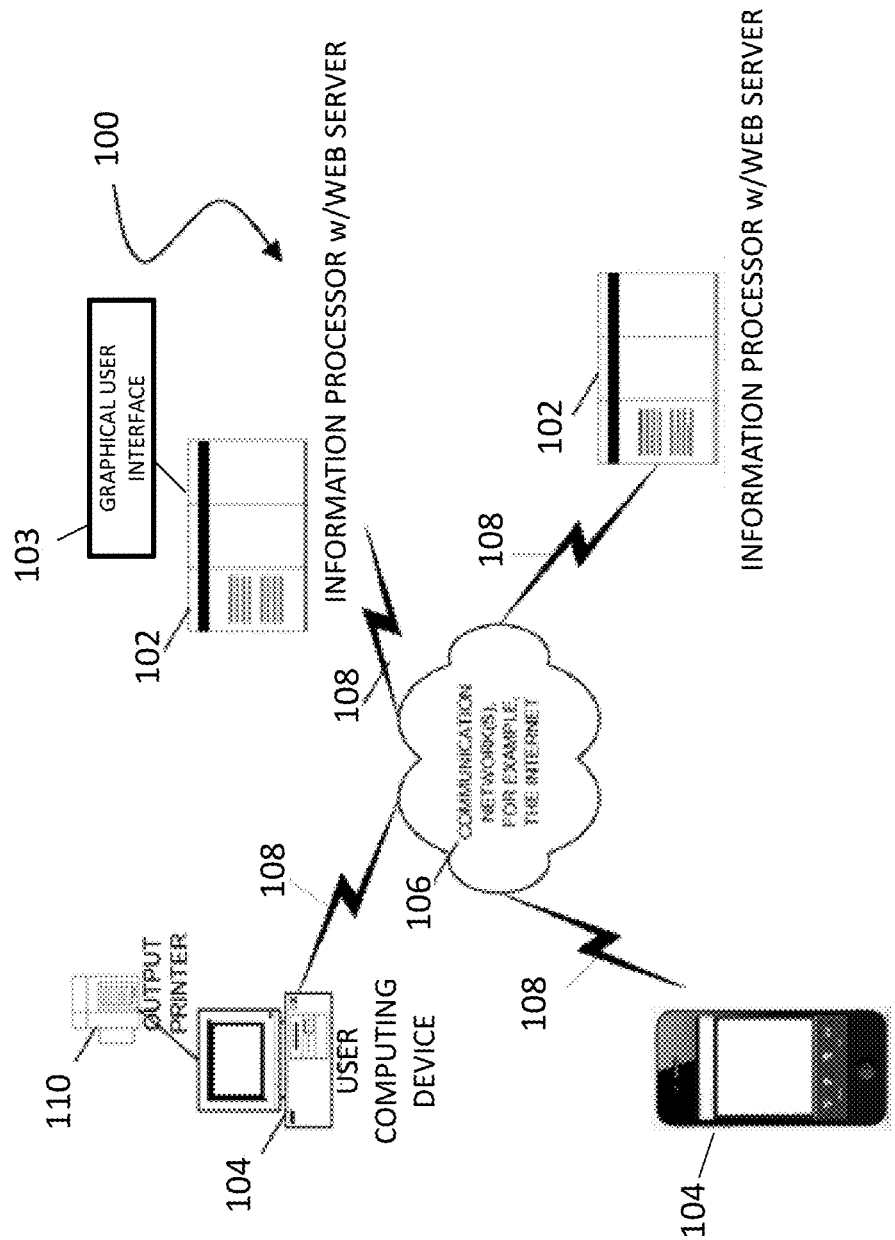
FIG. 1 is a diagram of an example hardware arrangement that operates for providing the systems and methods disclosed herein.

Referring now to the drawings in which like reference numerals refer to like elements, there is shown in FIG. 1 a diagram of an example hardware arrangement that operates for providing the systems and methods disclosed herein, and designated generally as system 100. The example system 100 is preferably comprised of one or more information processors 102 coupled to one or more user computing devices 104 across communication network 106. User computing devices 104 may include, for example, mobile computing devices such as tablet computing devices, smartphones, personal digital assistants or the like. Further, printed output is provided, for example, via output printers 110.

Information processor 102 preferably includes all necessary databases for the present invention, including image files, metadata and other information, such as relating to individuals, performance of services, or other relevant information. However, it is contemplated that information processor 102 can access any required databases via communication network 106 or any other communication network to which data processor 102 has access. Information processor 102 can communicate with devices comprising databases using any known communication method, including a direct serial, parallel, USB interface, or via a local or wide area network. Database(s) that are accessible by information processor 102 can contain and/or maintain various data items and elements that are utilized throughout the various operations of the system (100). For example, the database(s) can contain include user information, including account information concerning the user's various accounts third-party content and service providers. The database(s) can also include user preferences concerning operation of the system 100 and other settings related to the third-party content and service providers. By way of further example, the database (s) can also include a library of user computing devices 104, service dividers and receivers of respective services. One or more implementations, one or more databases can include datafiles representing specific signatures.

User computing devices 104 can communicate with information processor 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers to display the received data on display devices incorporated therewith. By way of example, user computing device 104 may be personal computers such as Intel Pentium-class computers or Apple Macintosh computers, but are not limited to such computers. Other computing devices which can communicate over a global computer network such as smartphones, tablets, personal digital assistants (PDAs) and mass-marketed Internet access devices can be used. In addition, the hardware arrangement of the present application supports devices that are connected via wired or wireless protocols via communication network 106.

System 100 preferably includes software that provides functionality described in greater detail herein, and preferably resides on one or more information processors 102 and/or user computing devices 104. One of the functions performed by information processor 102 is that of operating as a web server and/or a web site host. Information processor 102 typically communicates with communication network 106 across a permanent i.e., unswitched data connection 108. Permanent connectivity ensures that access to information processor 102 is always available.

Figure 2:
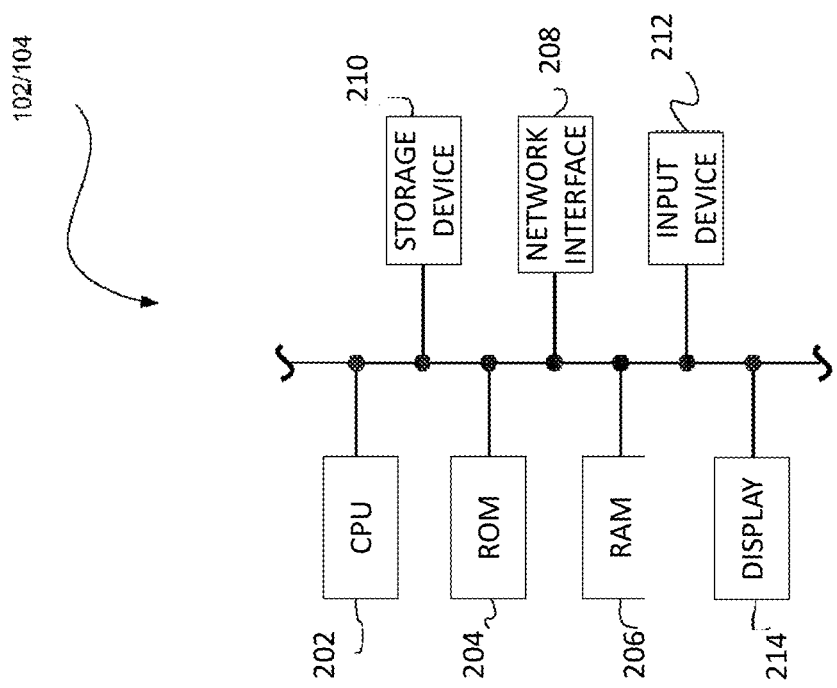
FIG. 2 is a block diagram that illustrates the functional elements of an information processor or user computing device, in accordance with an implementation of the present application.

As shown in FIG. 2 the functional elements of information processor 102 or user computing device 104, and preferably include one or more processors 202 used to execute software code in order to control the operation of information processor 102, read only memory (ROM) 204, random access memory (RAM) 206 or any other suitable volatile or non-volatile computer readable storage medium, which can be fixed or removable. FIG. 2 also includes one or more network interfaces 208 to transmit and receive data to and from other computing devices across a communication network. The network interface 208 can be any interface that enables communication between any of the devices (e.g., 102, 104) shown in FIG. 1 and includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the devices and/or communication networks, such as private networks and the Internet. Such connections can include a wired connection or a wireless connection (e.g., using the IEEE 802.11 standard known in the relevant art) though it should be understood that network interface 208 can be practically any interface that enables communication to/from the processor 202.

Continuing with reference to FIG. 2, storage device(s) 210 can be included such as a hard disk drive, floppy disk drive, tape drive, CD-ROM or DVD drive, flash memory, rewritable optical disk, rewritable magnetic tape, or some combination of the above for storing program code, databases and application code. In certain implementations, memory 204, 206 and/or storage device(s) 210 are accessible by the processor 202, thereby enabling the processor 202 to receive and execute instructions stored on the memory 204, 206 and/or on the storage 210. Further, elements include one or more input devices 212 such as a keyboard, mouse, track ball and the like. Input device 212 can include other specialized hardware and/or software components, such as a camera, microphone or other captured devices. Moreover, display 214 can include a screen or any other such presentation device that enables the system to instruct or otherwise provide feedback to the user regarding the operation of the system (100). By way of example, display 214 can be a digital display such as an LCD display, a CRT, an LED display, or other such 2-dimensional display as would be understood by those skilled in the art. By way of further example, a user interface and the display 214 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So when the touch screen is touched, the interface communicates this change to processor, and settings can be changed or user entered information can be captured and stored in the memory.

One or more software modules can be encoded in the storage device(s) 210 and/or in the memory 204, 206. The software modules can comprise one or more software programs or applications having computer program code or a set of instructions executed in the processor 202. Such computer program code or instructions for carrying out operations or aspects of the systems and methods disclosed herein can be written in any combination of one or more programming languages, as would be understood by those skilled in the art. The program code can execute entirely on one computing device (e.g., information processor 102) as a stand-alone software package, partly on one device and partly on one or more remote computing devices, such as, a user computing device 104, or entirely on such remote computing devices. In the latter scenario and as noted herein, the various computing devices can be connected to the information processor 102 through any type of wired or wireless network, including a local area network (LAN) or a wide area network (WAN), or the connection can be made to an external computer (for example, through the Internet using an Internet Service Provider). It should be understood that in some illustrative embodiments, one or more of the software modules can be downloaded over a network from another device or system via the network interface 208. For instance, program code stored in a computer readable storage device in a server can be downloaded over a network from the server to the storage 210.

It is to be appreciated that several of the logical operations described herein are implemented (1) as a sequence of computer implemented acts or program modules running on the various devices of the system 100 and/or (2) as interconnected machine logic circuits or circuit modules within the system (100). The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Thus, the various components of information processor 102 need not be physically contained within the same chassis or even located in a single location. For example, as explained above with respect to databases which can reside on storage device 210, storage device 210 may be located at a site which is remote from the remaining elements of information processor 102, and may be connected to CPU 202 across communication network 106 via network interface 208.

The nature of the present application is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, IOS, ANDROID, TORR and various web application development environments.

As used herein, references to displaying data on user computing device 104 refer to the process of communicating data to the computing device across communication network 106 and processing the data such that the data can be viewed on the user computing device 104 display 214 using a web browser or the like. The display screens on user computing device 104 present areas within control allocation system 100 such that a user can proceed from area to area within the control allocation system 100 by selecting a desired link. Therefore, each user's experience with control allocation system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of control allocation system 100.

In one or more implementations, the present application is particularly well-suited for home healthcare services. A series of data entry, processing, and communication modules can be provided via a mobile application ("mobile app"), that can be installed on a worker's user computing device 104. This allows the user, such as a home healthcare provider, on a daily basis, to electronically submit his or her timesheet for work performed, such as for a respective patient.

As shown and described herein, the present application provides a technical solution to a technical problem with respect to confirming that work that is indicated as having been performed by a provider was indeed performed. In one or more implementations, signatures and other entries are submitted within a pre-defined and respective period of time. This can be at least partially effected as a function of system level operations associated with user computing device 104 (FIG. 1). In one or more implementations, one or more modules executing on user computing device 104 provides for determining an amount of time (e.g., in seconds or less) since the device was last rebooted. Rebooting a user computing device 104 can refer herein, generally, as powering down the user computing device 104, and/or restarting user computing device 104.

Continuing with reference to confirming that one or more respective time entries, after a first signature, photograph, sound recording, or other form of input is received by a computing device 104, one or more modules executing on user computing device 104 records the time of occurrence, which can be defined as TO. In one implementation, TO is the recorded time of occurrence. Alternatively or in addition, TO represents the amount of time since the previous boot (or reboot). As additional inputs are received, such as from the same or different user, the respective times are recorded and used in a calculation to determine an amount of time passage. A determination can be made whether any respective input or entry occurs at a time that is greater than a defined time, such as 5 minutes, relative to another input or entry. In case a respective entry occurs later than the defined time period, then an internal check fails and additional steps can be taken, such as to generate and/or transmit an alert to a user computing device 104, the information processor 102, or other suitable device. Thus, a determination of the delta between the time of a first capture and subsequent captures is usable to detect whether such captures are provided within a predefined tolerance. This is insured as a function of a system level and virtually unmodifiable function that is respectively implemented on respective user computing device(s) 104 and/or information processor(s) 102.

In one or more implementations, a timestamp representing the moment of capture is associated with a respective data file, such as metadata provided with or otherwise linked to an image file, a sound file, or other object. Other information can suitably be included, such as a time value representing a value of time from the last reboot that occurred. In one or more implementations, such values are encrypted such that user tampering is reduced or other eliminated. In one or more implementations, for example, a value is stored on a remote device (e.g., information processor 102) that is usable for decryption. Alternatively, or in addition, a remotely stored value can be altered as a function of time, such as an amount of time since the last reboot or a value representing the time of the last reboot. Thus, it is included herein that various methods for encrypting information stored on or otherwise accessible to user computing device 104 is a function of internal processes and characteristics respectively associated with hardware and software systems that are locally and/or remotely situated in a system.

In one or more implementations, a series of automatic and secure logging operations is performed, including in connection with a party who receives services, such as a patient. Operations associated with a user logging into the mobile app operating, for example, on the service receiver's user computing device 104 (e.g., smartphone) to clock-in and clock-out for the service provider, such as by noting in the mobile app an instance every time the mobile app is installed on a user computing device 104, each time a user computing device 104 reboots, and/or each time a user computing device 104 is used, such as by "clocking in and out." One or more modules configured with and/or executing via the mobile app identify a respective instance that the service provider used for the clock-in/out process. In addition, information can be generated, such as packaged in a message, and thereafter transmitted to computing devices 104/102 for view by supervisors or other authorized personnel.

For example, following a day's shift, a health caregiver opens the mobile app to submit his or her timesheet representing time worked. In one or more implementations, the caregiver complies with one or more security protocols, such as by submitting credentials. Credentials can be configured in various ways, such as encrypted public/private keys that are generated and/or exchanged upon user providing a username and password during a secure communication session with another computing device (e.g., information processor 102). Thereafter, one or more modules executing in the mobile app can retrieve scheduling information, such as the current day's and previous day's scheduled shifts. Such information can be provided via information processor 102. Depending on the respective implementation, the user can be prompted to select whether he or she wishes to submit time worked for the current day or the previous day. Once the user selects whether to submit time for the current day or the previous day, one or more modules executing via the mobile app can pre-fill the user's timesheet with his or her scheduled shifts for the selected day. The user can be prompted to edit start and/or end times to match the caregiver's start and end times representing times that were actually worked.

In one or more implementations, the present application can include modules configured with the mobile app to prompt a user to capture the service provider's signature and the service receiver's signature using a stylus, fingertip, or other suitable object on the touchscreen configured with the service provider's user computing device 104. The mobile app can be configured to cause the user computing device 104 to store digital images of both signatures, either locally along with a time stamp indicating the time and date the signature was captured. Furthermore, the mobile app can be configured to prompt the user to capture pictures of the service provider (e.g., a caregiver) and of the service receiver (e.g., a patient) using the service provider's smartphone. Alternatively, or in addition, the mobile computing device can be configured to automatically cause a camera and/or microphone component (e.g., via input device 212) to capture input, without requiring manual user entry. Furthermore, the application can be configured to store digital files, such as images of both pictures, locally on a user computing device, e.g., the user's smartphone, along with a time stamp indicating the time and date the picture was captured. In one or more implementations and in an effort to ensure proper security, the present application does not permit a user to select a pre-existing picture from the smartphone to confirm performance of work on a timesheet.

In one or more implementations, once a user has confirmed his or her time entries in a timesheet for submission, and captured pictures of him or herself and the party receiving services (e.g., a patient), and captured respective signatures, one or more modules executing in the mobile app can prompt the user to submit the timesheet, such as by selecting a graphical screen control configured in a user interface provided on user device 104. For example, when the service provider (e.g., caregiver) selects "Submit," the mobile app can be configured to confirm the following: (i) both service provider and the service receiver signatures have been captured; (ii) both service provider and the service receiver images have been captured (e.g., via a camera configured with a user computing device 104); (iii) service provider picture and service provider signature were captured within 5 minutes of each other; and (iv) service receiver picture and service receiver signature were captured within 5 minutes of each other. In the event that a determination is made, including as a function of one or more modules executing on the mobile app, that any of the foregoing is not confirmed then one or more actions can be taken. For example, a prompt can be generated and provided to the user of the respective user computing device 104 to correct the correct the deficiency and resubmit, at which point the mobile app again confirms the foregoing four facts. Alternatively, an alert is automatically generated and transmitted to one or more devices (e.g., 102 and/or 104) representing the condition. In yet another alternative, more invasive actions can be taken, such as to lock the user's computing device 104 and preclude further attempts to submit a timesheet.

In or more implementations, the present application includes one or more modules configured to cause the mobile app to operate in different modes, depending on whether the selected day is the last day of the week or is mid-week. For example, if the selected day is a defined to be the last day of a week, perhaps regardless of the actual day, the application carries out in accordance with one operational protocol. If the selected day is defined to be a different day, then the application carries out in accordance with a different operational protocol.

As noted herein and in connection with capturing an image (or other suitable content), the mobile app uses hardware and one or more of a user computing device's operating system's native audio and/or visual capture and manipulation facilities. For example, after an image that is associated with a service provider or service receiver is captured via the user interface provided by the mobile app, one or more modules executing via the mobile app retrieves date and time information, such as from the user computing device 104, and records it in the app's internal data storage area. For example, the mobile app designates an area in a display of the user interface and initiates "continuous touch monitoring" so that it can capture a signature from the user using a capacitive stylus, a finger, or other object. Once the user has completed entering a signature, content received at the designated area of the screen is converted, for example, to an image file format and associated with the date and time from the mobile device.

It is recognized herein that date/time information obtained or other received from a respective user computing device 104 may not, for example, be secure, accurate or may be altered (intentionally or otherwise) by a user. As noted herein, security and/or encryption methods are supported, and a remotely accessed time-stamp program can be implemented to increase the likelihood and/or ensure that date/time information is accurate. For example, a user computing device 104 operating the mobile apps receives secure date/time information remotely, such as over the internet, while information is entered and/or captured in accordance with the teachings herein.

For example, e-time stamp data authentication provides trusted a digital timestamp that provides strong evidence that the contents of work existed at a point-in-time and have not been changed since that time. Such procedures maintain privacy of documents and/or information, thereby resulting in a relatively simple yet secure, independent and portable mechanism of proof of electronic record integrity. By using digital signature technology and audited security in such ways, an external virtual witness (e.g., a process securely providing a timestamp signature) to the existence of data is provided, which operates as a virtual electronic or digital notary. In operation, a user computing device 104 records a virtual fingerprint of each electronic file. The internet links to a web-based security service, which returns a signed electronic timestamp certificate that contains the file's fingerprint. Effectively, the time at which a respective event is recorded by a computer is the timestamp, as opposed to the time of an event, per se.

In one or more implementations, data associated with timestamp authentication are presented in a consistent format, thereby allowing for easy comparison of potentially different records and tracking progress over time.

The present application is now further described in connection with an example implantation shown in FIGS. 3-15. In the example implementation(s) shown in FIGS. 3-15, a user computing device 104 is shown executing the mobile app, including an example graphical user interface, and a step-by-step process is shown by service provider (illustrated as health caregiver) and service receiver (illustrated as patient) in which photos and signatures are submitted. Although the examples in FIGS. 3-15 refer to Caregivers and Patients, one of ordinary skill will recognize that the present application is applicable for virtually any industry members in which verification of time-sheet entries is needed.

Figure 3:
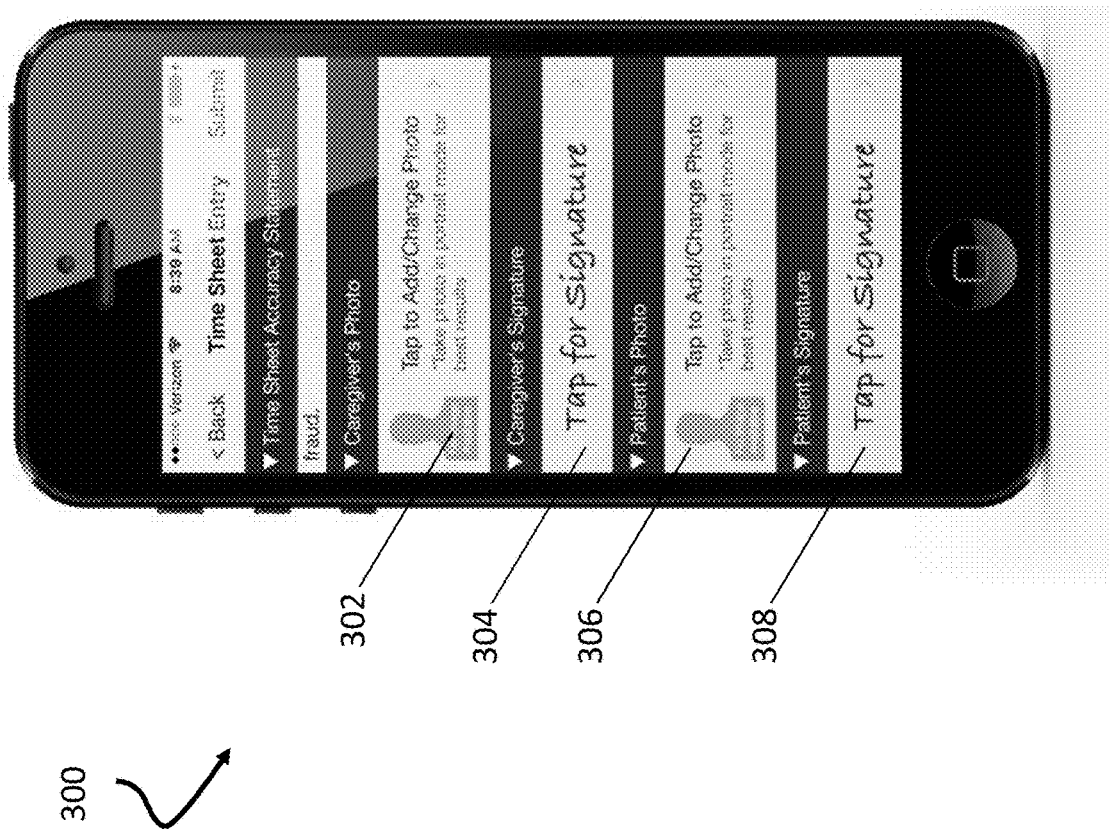
FIG. 3 is an example display screen comprising selectable graphical screen controls for reviewing an accuracy statement, adding photographs and digital signatures, in accordance with an implementation of the present application.

With reference to FIG. 3, prior to submitting shift information for the last respective workday of a given week, one or more photographs of users (e.g., caregivers and patients) of the mobile app are to be captured. In addition, the photographs, signatures of both the caregiver and the patient are provided. As shown in the example screen display 300 in FIG. 3, graphical controls 302/306 are respectively useable to add/change photographs for the respective parties, and controls 304/308 are respectively usable to cause the user computing device 104 to capture handwritten signatures electronically. In one or more implementations, the process for capturing photographs and signatures for a patient is effectively the same for capturing photographs and signatures for a caregiver. For illustration purposes, features of an example mobile app executing on user computing device 104 are shown for a caregiver.

Figure 4:
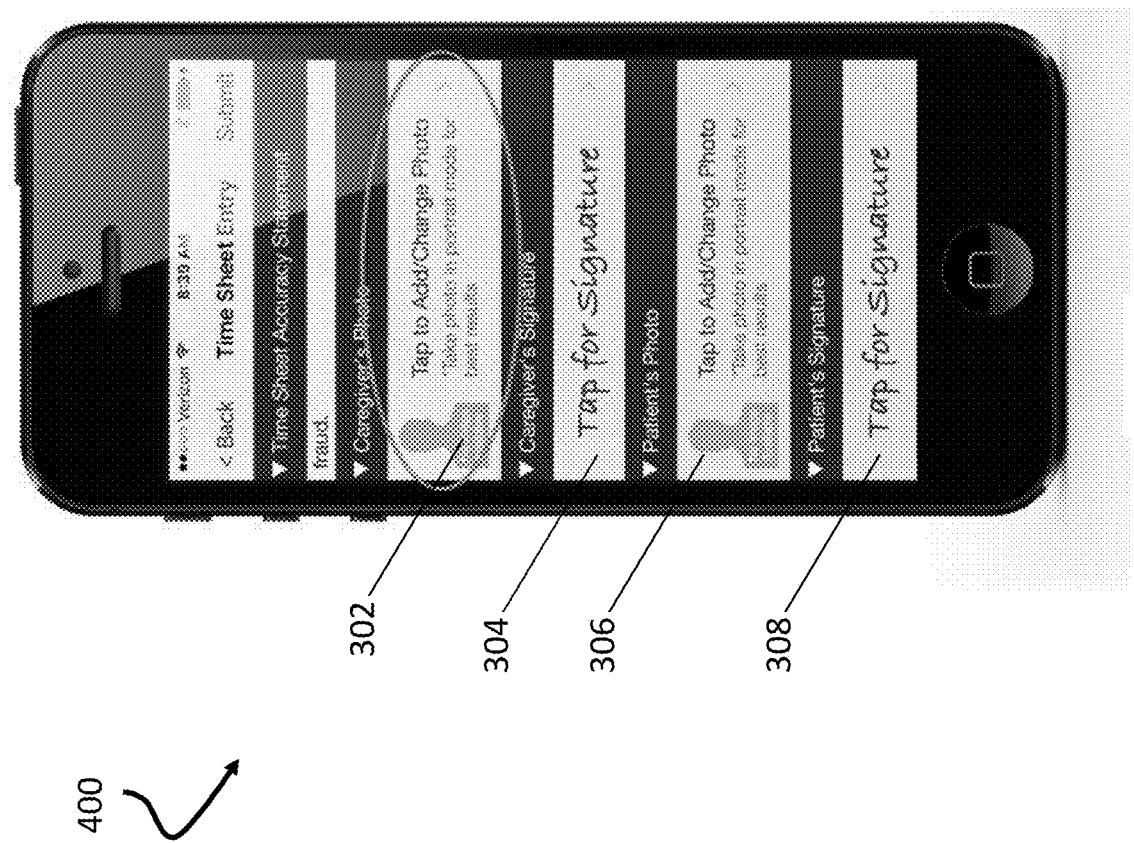
FIG. 4 is the example data entry display screen shown in FIG. 3, with one of the options respectively highlighted.
Figure 5:
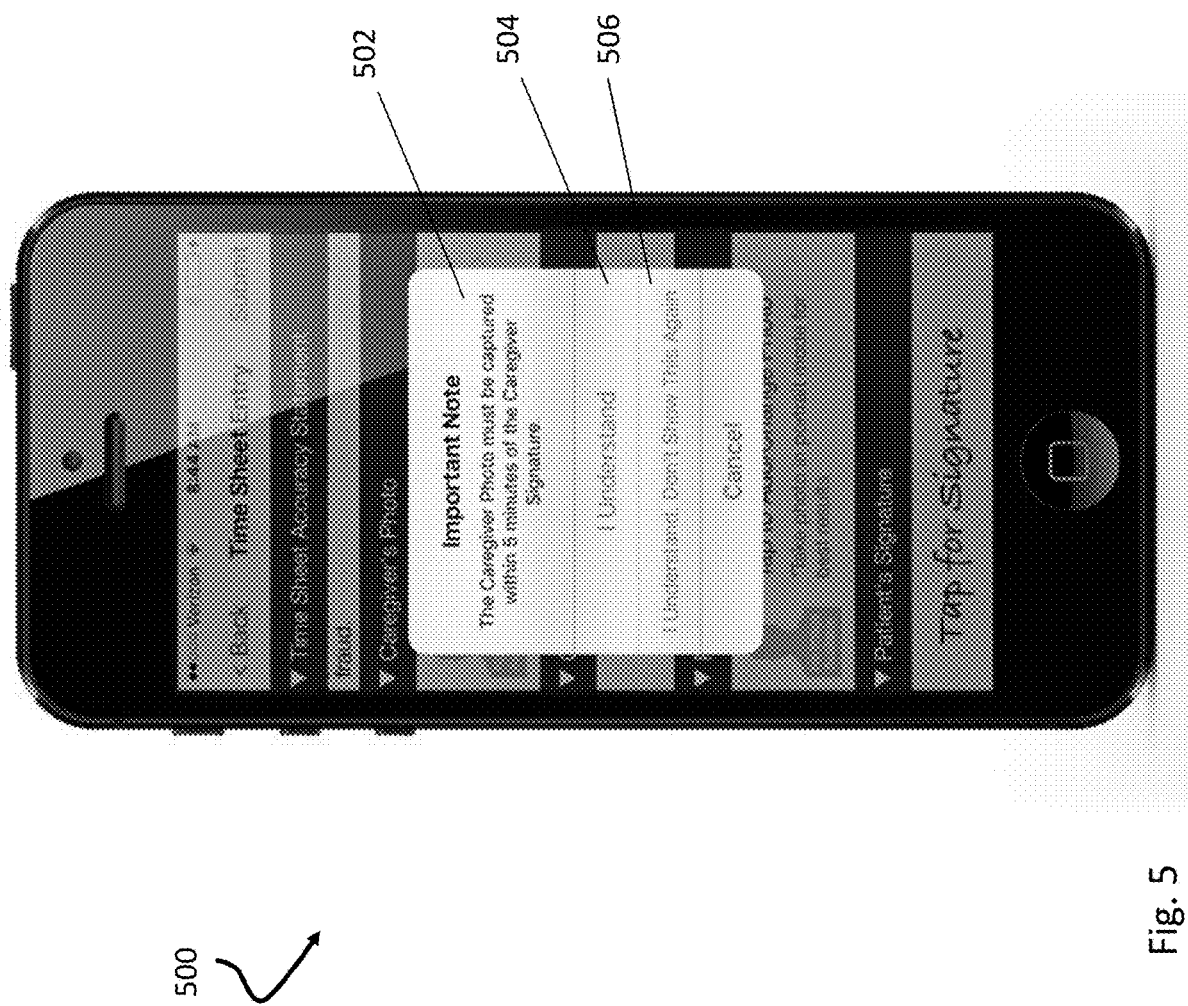
FIG. 5 is an example display screen comprising selectable graphical screen controls for acknowledging time requirements, in accordance with an implementation of the present application.

With reference to the example display screen 400 shown in FIG. 4, initially a user selects (e.g., "taps" on) a graphical screen control 302 to add/change a photograph for a service provider "Caregiver's Photo" row in the table. With reference to the display screen 500 illustrated in FIG. 5, when the user taps on the Caregiver's Photo row in the table, one or modules executing via the mobile app can present a "Hint Dialog" 502 to inform the user that the Caregiver's photo and signature must be captured within 5 minutes of each in order to be valid for timesheet submission. After tapping "I Understand" control 506 or "I Understand Don't Show This Again" control 506, the user is presented with a menu of choices, such as illustrated in display screen 600 shown in FIG. 6.

Figure 6:
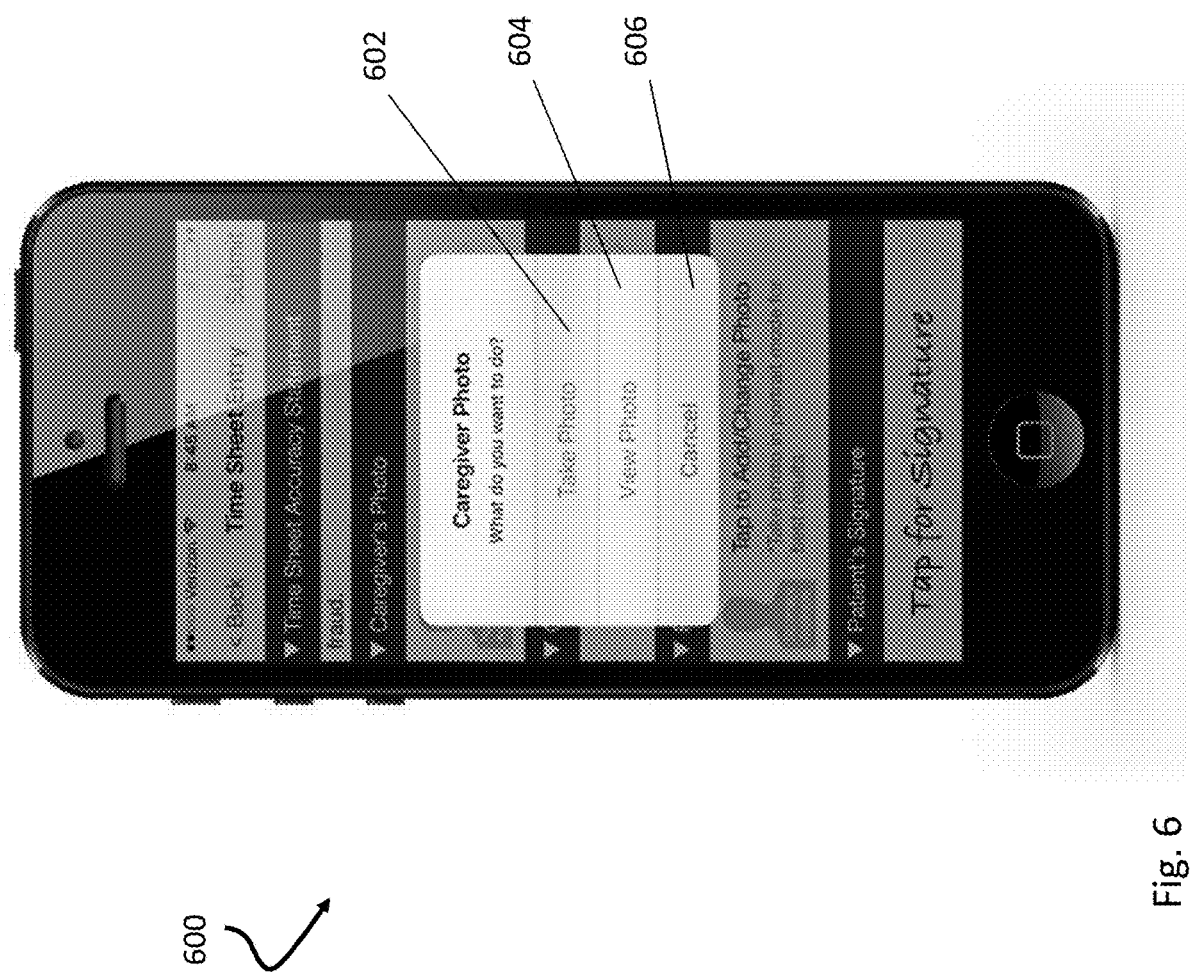
FIG. 6 is an example display screen comprising selectable graphical screen controls for taking and viewing a picture ("photo"), in accordance with an implementation of the present application.
Figure 7:
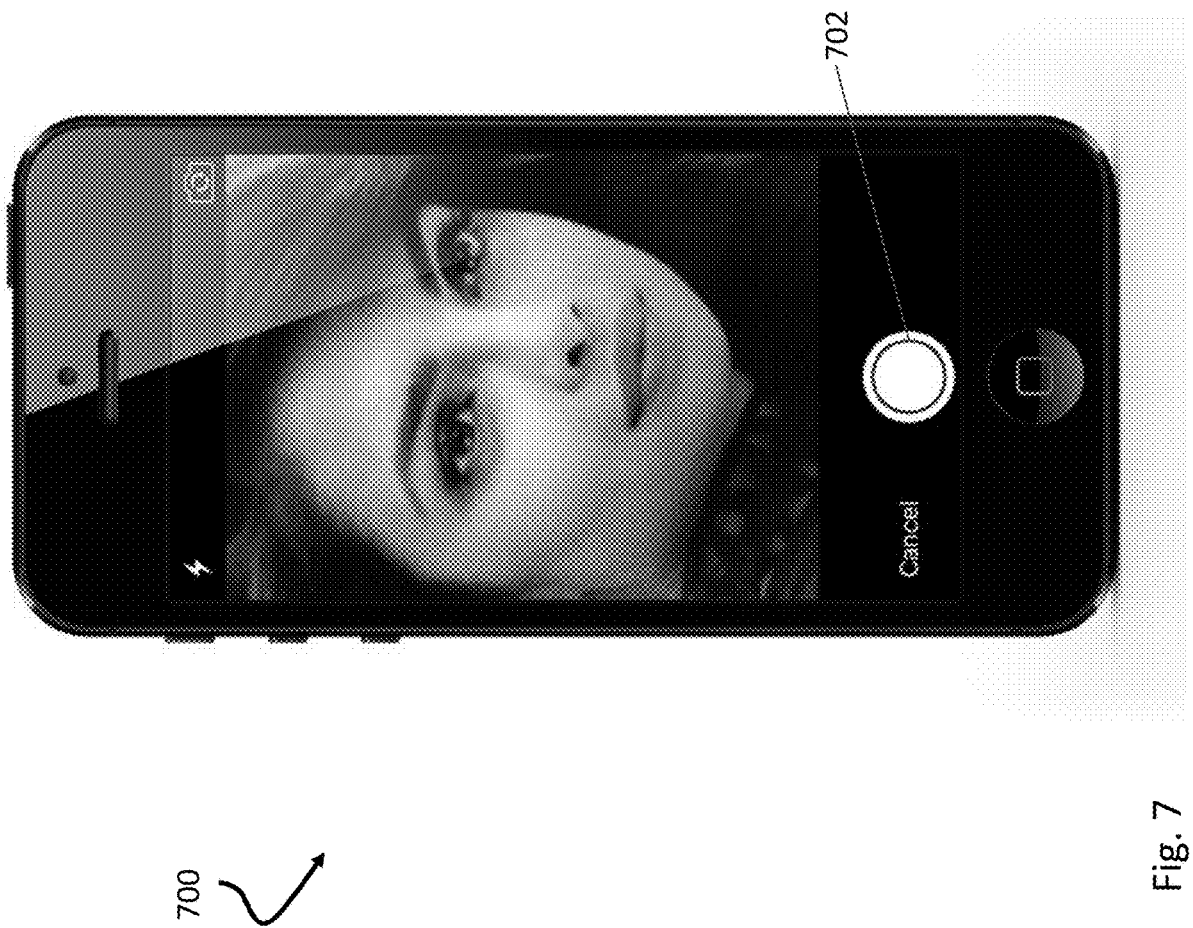
FIG. 7 is an example display screen illustrating picture taking functionality, in accordance with an implementation of the present application.

The example display screen 600 illustrated in FIG. 6 illustrates an example menu providing provided for a user to select options for a user to take a new photo 602, view an existing photo in a full-screen format 604 or cancel the photo capture operation 606. In case a user selects the "Take Photo" option 602, the device's native camera function is invoked, such as illustrated in example display screen 700 shown in FIG. 7. Once the user taps the button 702 to capture the image, the user can either retake the image or use the one most recently captured.

Figure 8:
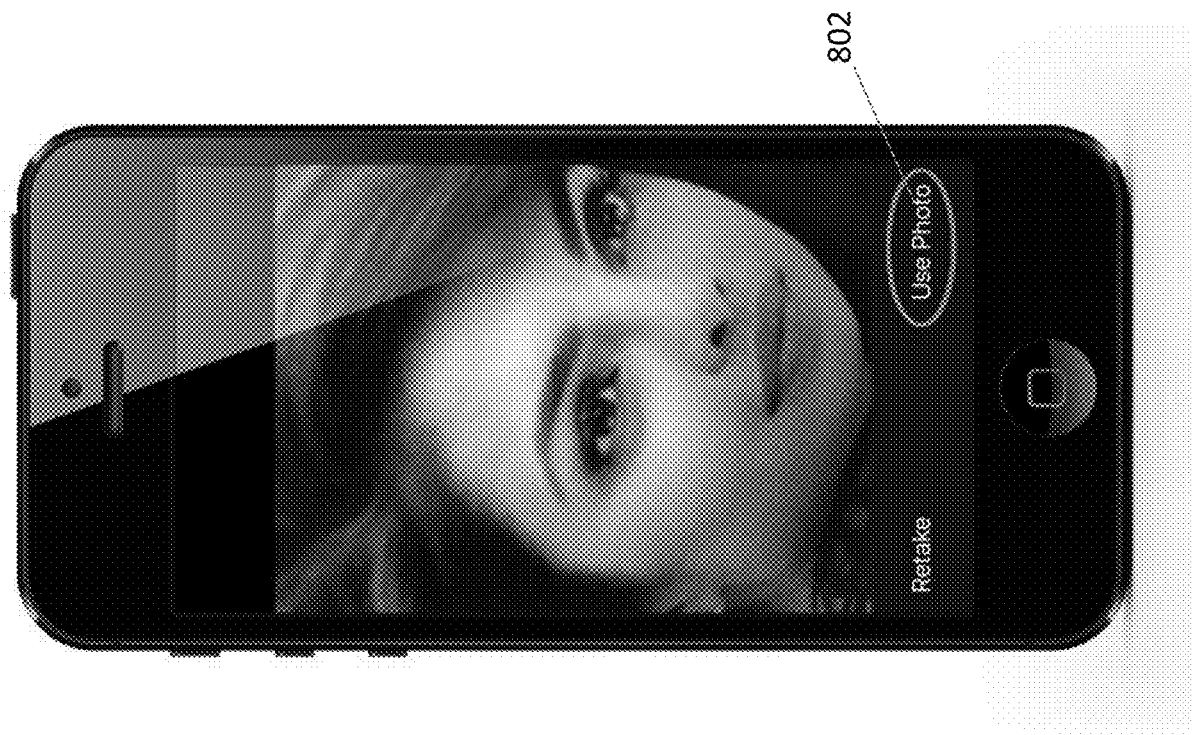
FIG. 8 is an example display screen comprising selectable graphical screen controls for using or retaking a picture, in accordance with an implementation of the present application.
Figure 9:
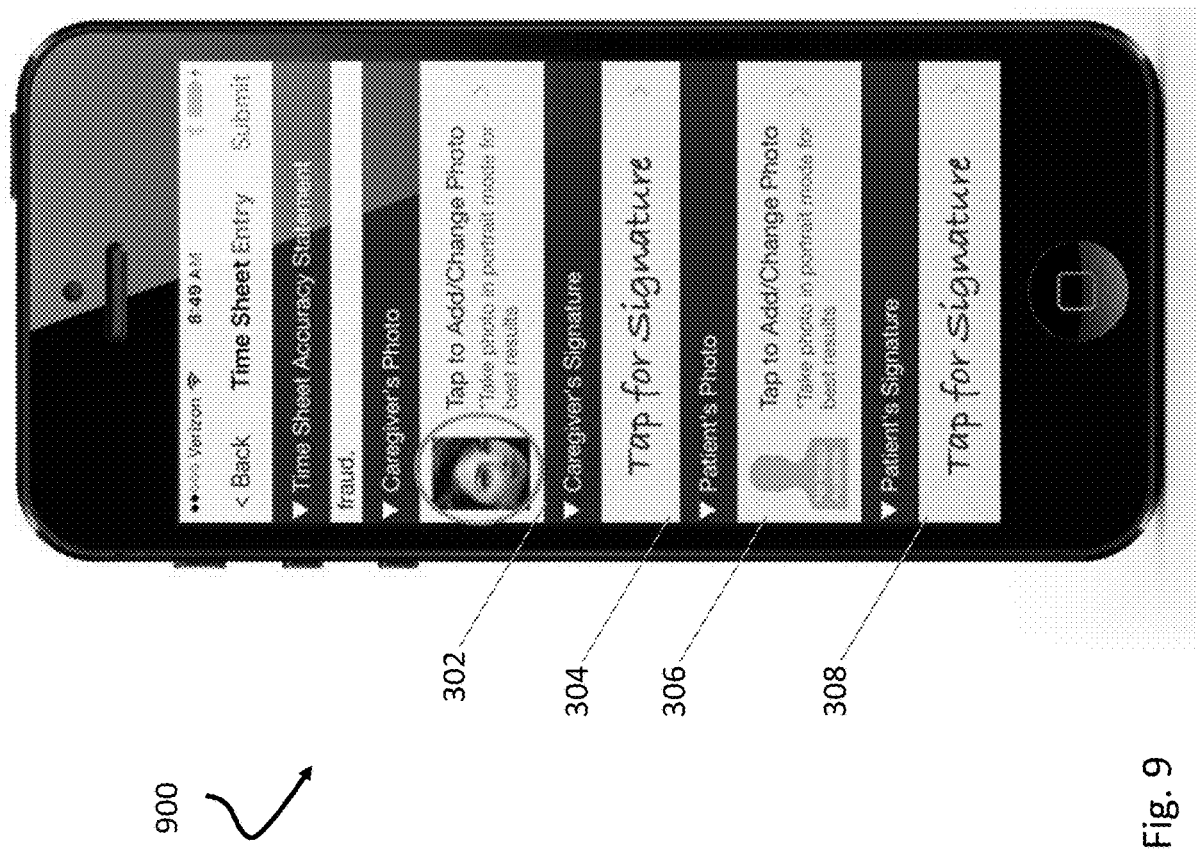
FIG. 9 is the example data entry display screen shown in FIG. 3, and showing a thumbnail of a picture, in accordance with an implementation of the present application.
Figure 10:
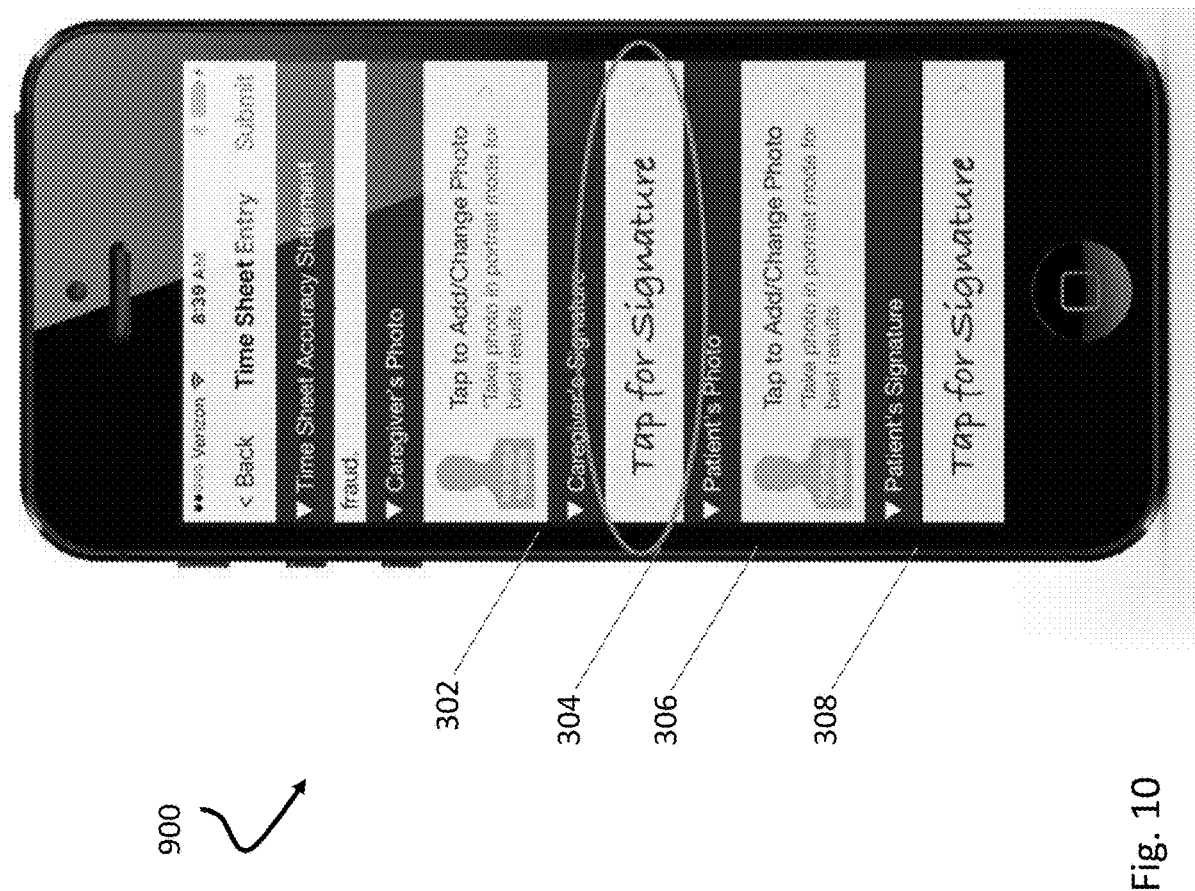
FIG. 10 is the example data entry display screen shown in FIG. 3, with one of the options respectively highlighted.
Figure 11:
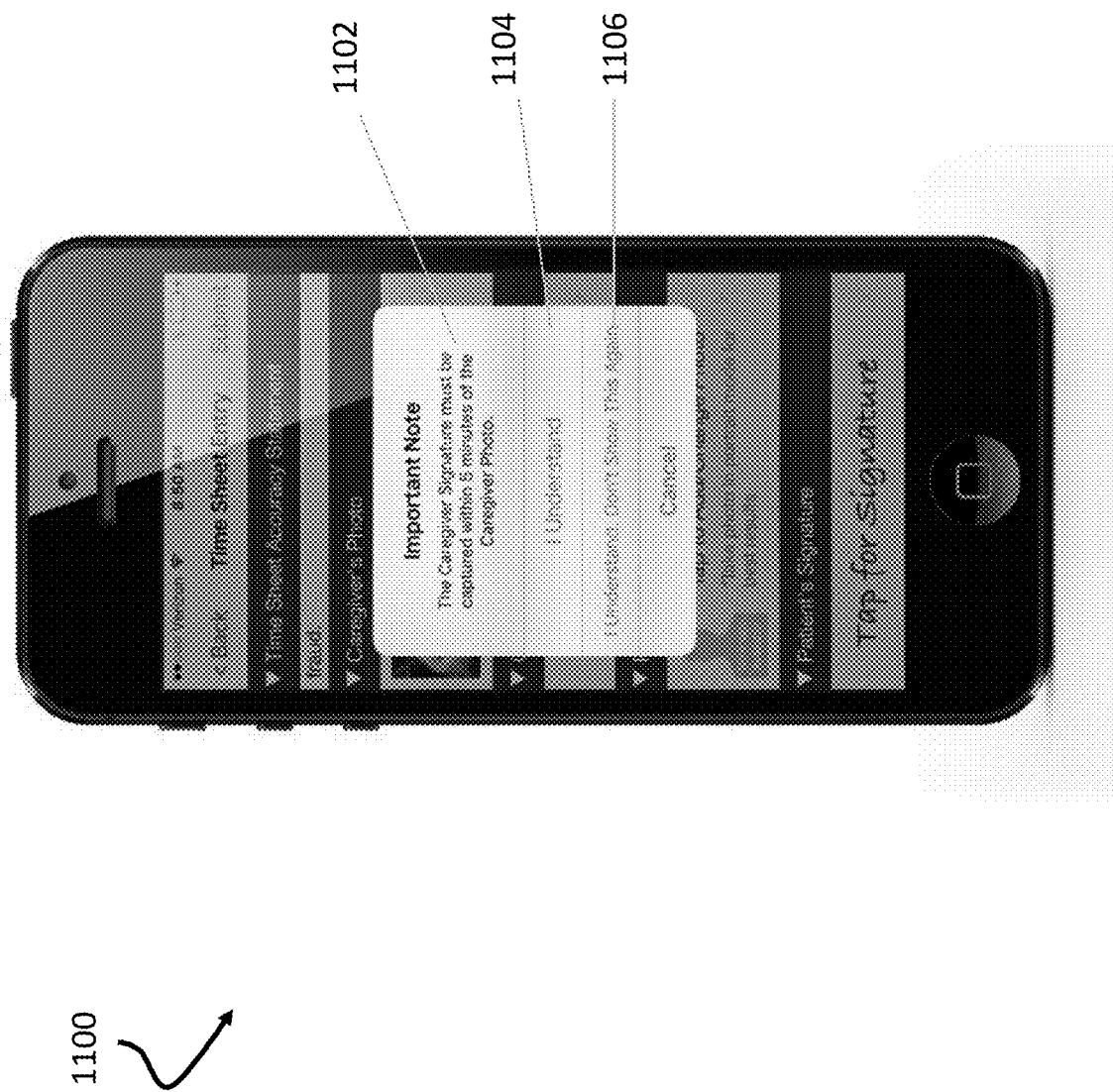
FIG. 11 is an example display screen comprising selectable graphical screen controls for acknowledging time requirements, in accordance with an implementation of the present application.
Figure 12:
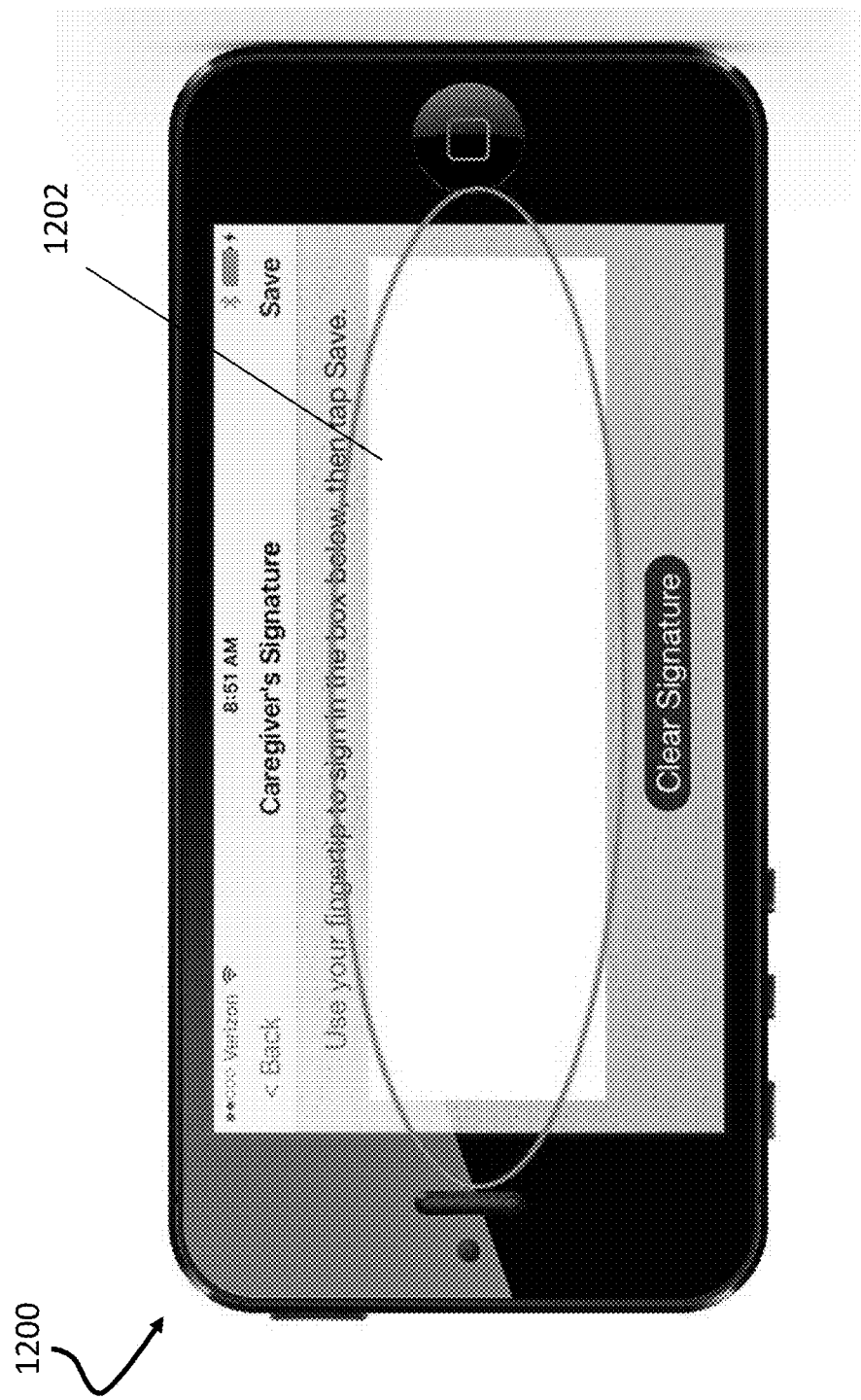
FIG. 12 is an example display screen comprising a signature entry section, in accordance with an implementation of the present application.
Figure 13:
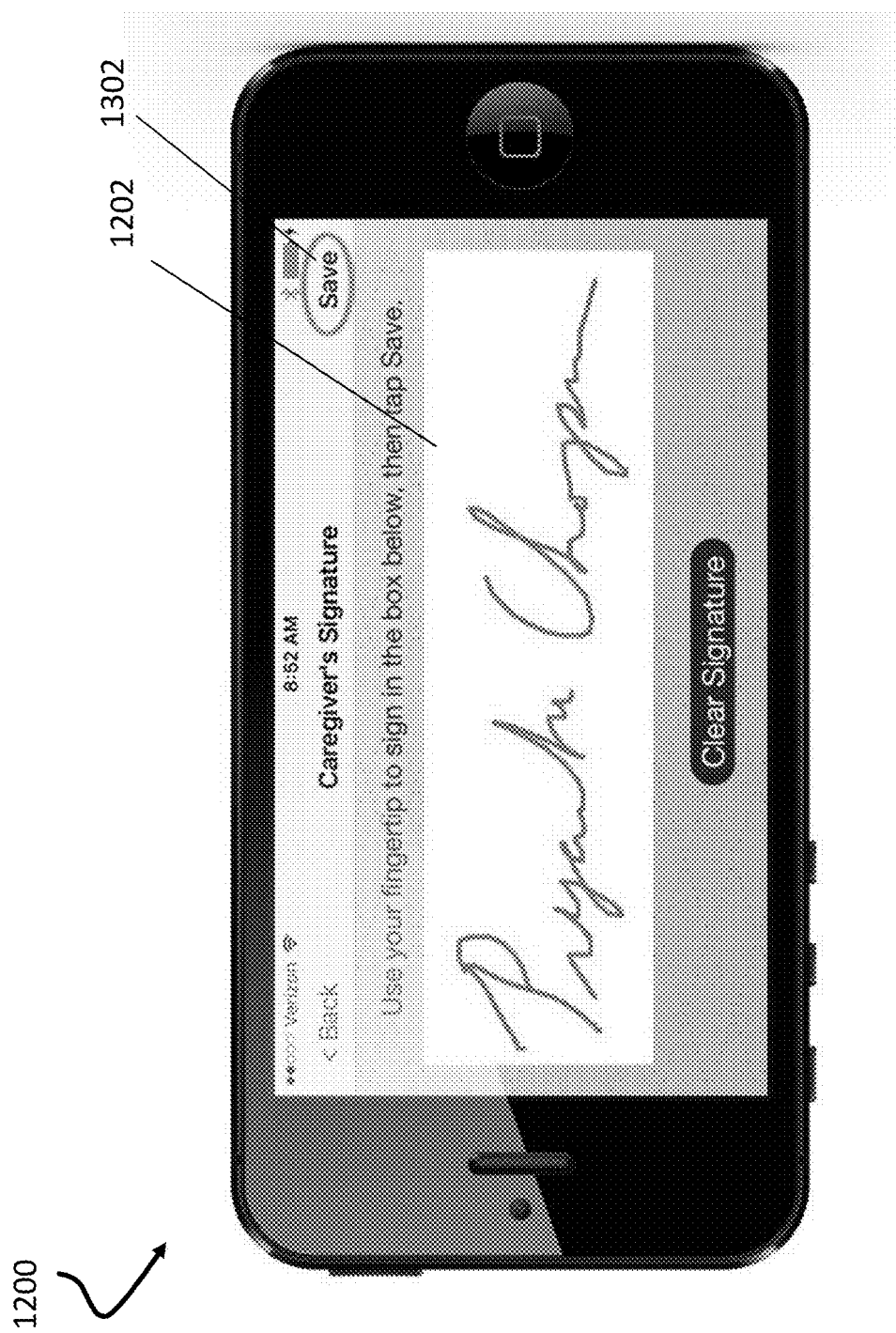
FIG. 13 is an example display screen showing a signature in a signature entry section, in accordance with an implementation of the present application.

With reference to the example display screen 800 illustrated in FIG. 8, a graphical screen control "Use Photo" button 802 is provided for a user to select to use the photograph displayed on device 104 for timesheet verification. In one or more implementations, the image is stored in the device's internal memory under a file structure that associates the photograph with the current timesheet's date/time. The date/time of when the "Use Photo" button was tapped is retrieved from the device's internal system clock and stored in internal memory as well. This becomes the "timestamp" for the Caregiver's photo capture event. Thereafter, the mobile app returns to the timesheet submission screen that has been updated with the Caregiver photo that was just captured, for example, as illustrated in the example display screen 900 shown in FIGS. 9 and 10. Therein, a series of screen displays are provided to illustrate example processes for capturing the service provider's signature. After a user selects the "Caregiver's Signature" row 304 in the table, a Hint Dialog 1102 is provided in display screen 1100 informing the user that the Caregiver's signature and photo must be captured within 5 minutes of each in order to be valid for timesheet submission. After tapping "I Understand" option 1104 or "I Understand Don't Show This Again" control 1106, the user is presented with the signature capture screen 1200, which designates a rectangular area 1202 in which the mobile app records "touches" made by the user. In one or more implementations, the mobile app executing on the user computing device 104 uses the device's 104 native low-level graphics hardware to capture the touches and draw the point of the touch on the screen. As the user moves his/her finger, capacitive stylus, or other suitable object across the designated area, the points join together to form a stroke just as they would if the user were signing their name on a piece of paper. A completed signature is shown in FIG. 13. If the user taps the "Save" button 1302, the content set forth in the rectangular area 1202 is converted to an image file using the device's native low-level graphics facilities. Thereafter, the image can be stored in the device's internal memory under a file structure that associates it with the current timesheet's date/time. The date/time of when the "Save" button 1302 was tapped is retrieved from the device's internal system clock and stored in internal memory of the user computing device 104, as well. Thereafter, the user computing device 104 is configured to generate a "timestamp" for the Caregiver's signature capture event.

Figure 14:
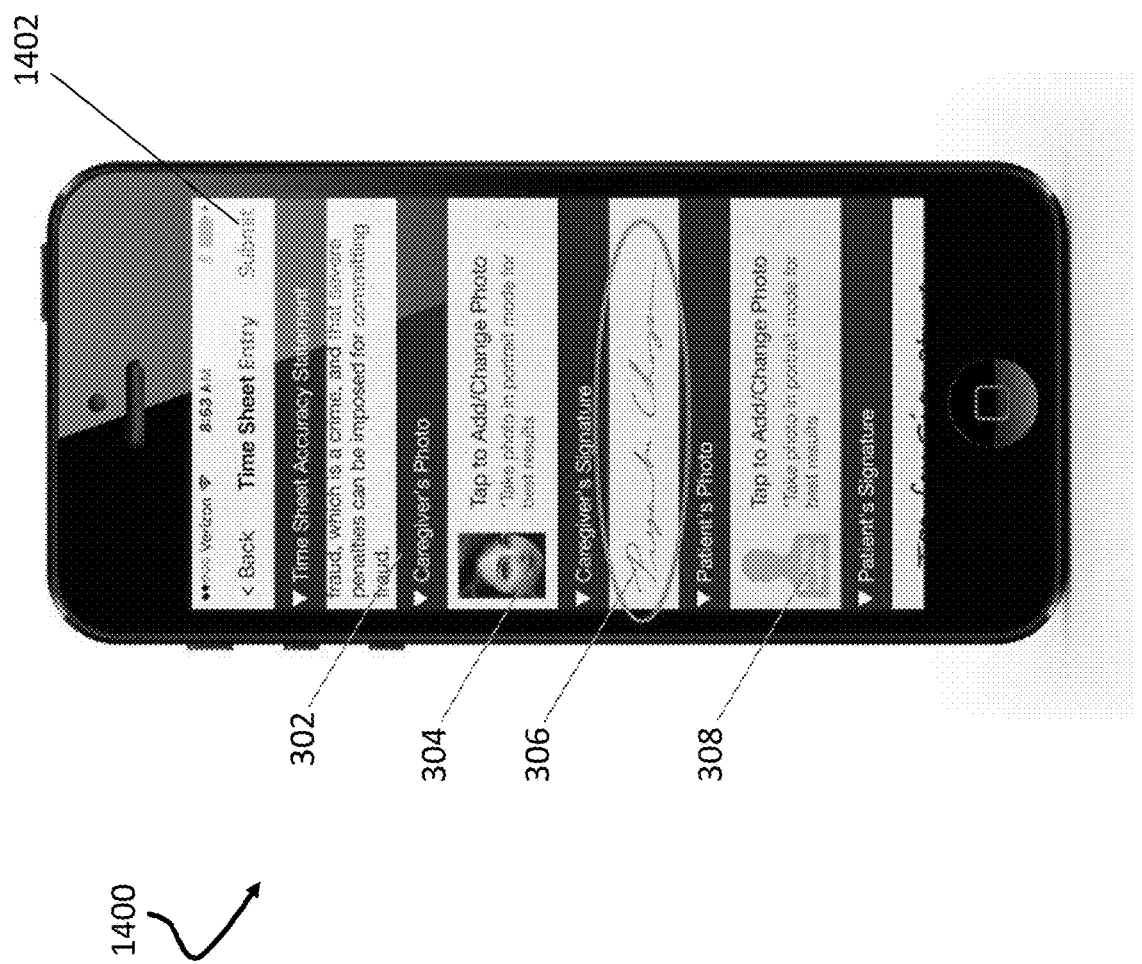
FIG. 14 is the example data entry display screen shown in FIG. 3, with one of the options respectively highlighted.
Figure 15:
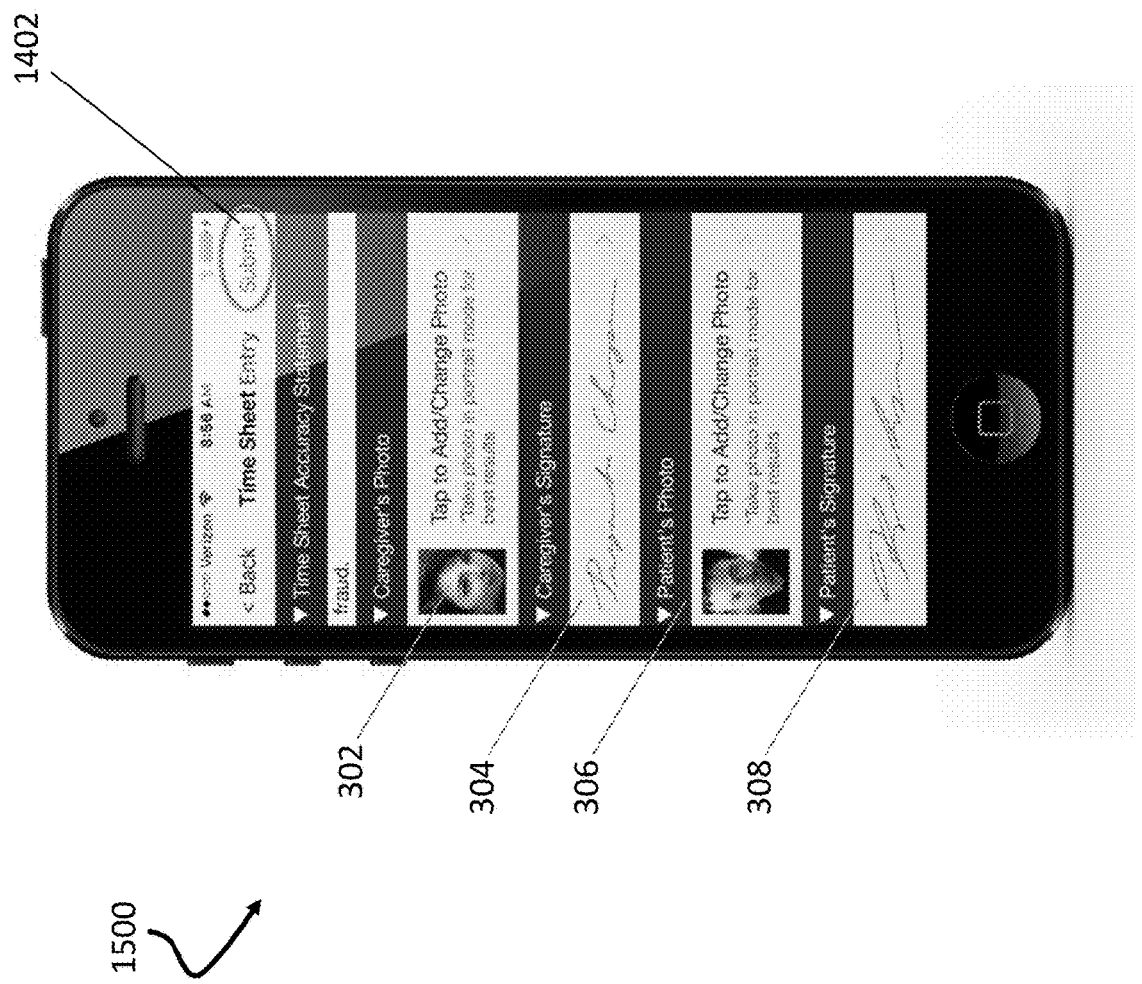
FIG. 15 is the example data entry display screen shown in FIG. 3, and showing thumbnails of two pictures and two signatures, in accordance with an implementation of the present application.

In one or more implementations, the mobile app returns to the timesheet submission screen that has been updated with the signature from the service provider (e.g., the "Caregiver") that was just captured, such as illustrated in FIG. 14. As noted herein, in one or more implementations, the process for capturing a photo and signature for a service receiver (e.g., "Patient") is the same as that for service provider. Once all four items (i.e., Caregiver Photo, Caregiver Signature, Patient Photo and Patient Signature) have captured, a display screen 1500 is provided (FIG. 15). When the user taps the Submit button 1402, the mobile app configures the user computing device 104 to determine whether the Caregiver photo and signature were taken within the predetermined period of time, such as five minutes, of each other based on the time stamps recorded as specified above. The mobile app further configures the user computing device 104 to determine whether the Patient photo and signature were taken within five minutes of each other. If both checks pass, the timesheet can be submitted via a secure communication session, such as to information processor 102.

Figure 16:
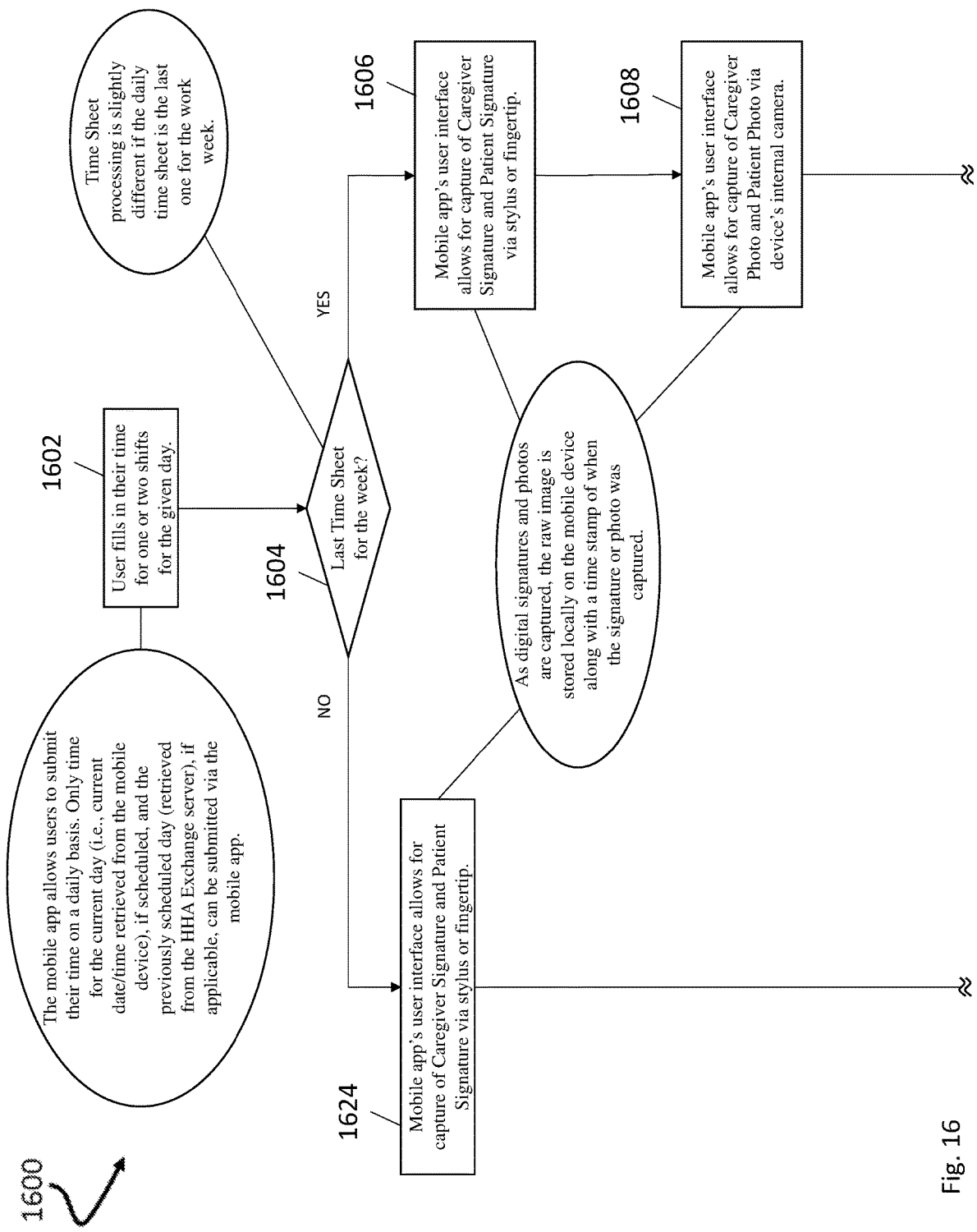
FIG. 16 is a flowchart showing an example process in accordance with electronically verifying a timesheet, in accordance with an implementation of the present application.
Figure 16:
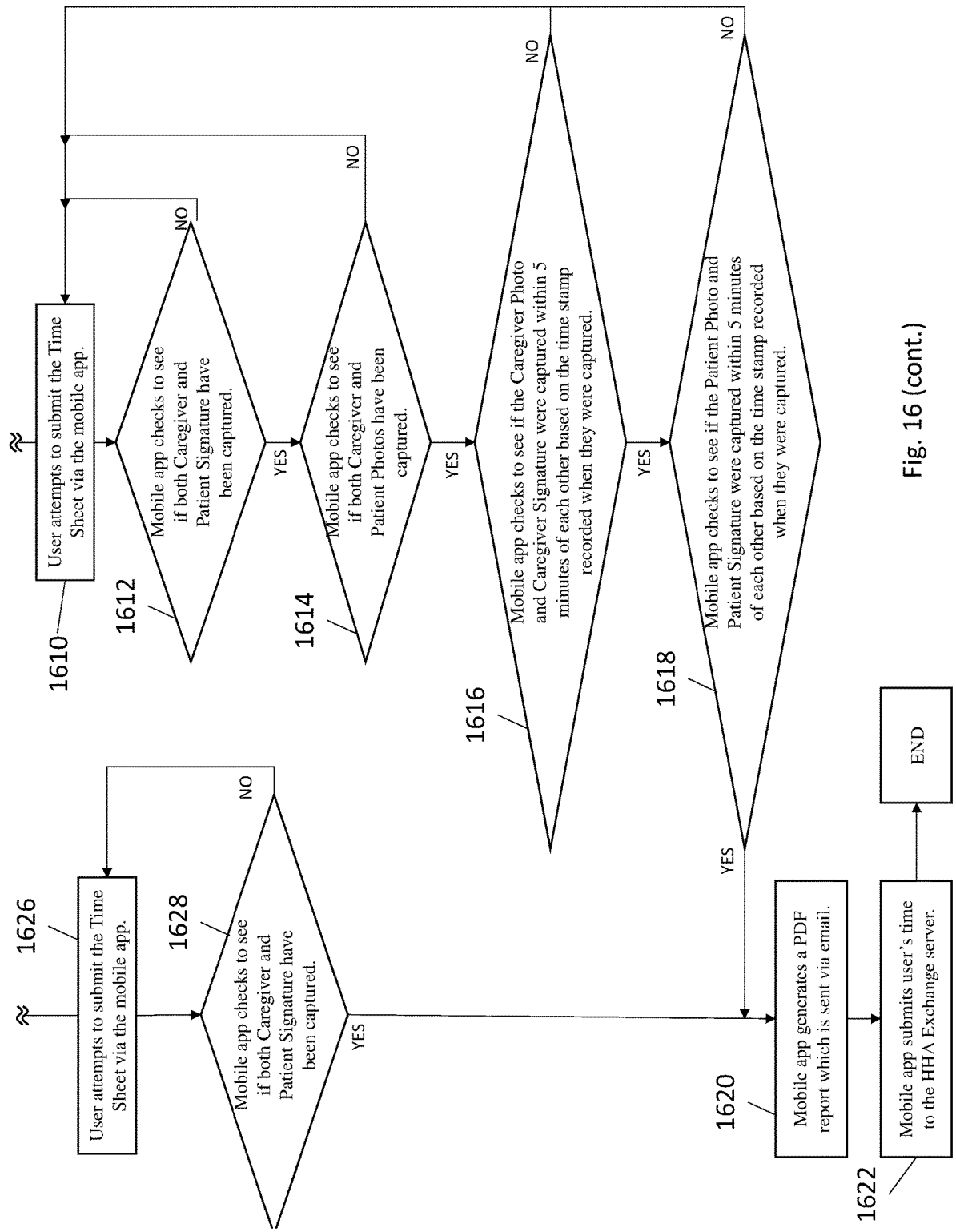

FIG. 16 is a process flow diagram of an example process 1600 representing interactions between one or more user computing devices 104 and one or more information processors 102, in accordance with an example implementation of the present application. In the implementation illustrated in the flow diagram of FIG. 16, the mobile application restricts users to submit timesheets to a daily basis. Moreover, only time for a current day can be submitted, which is verified as a function of current day and time values automatically obtained from a user computing device, and only in cases in which when work is confirmed as scheduled for the current day or the previous day. Such information can be obtained and/or confirmed as a function of information accessed and/or provided via information processor 102.

Continuing with reference to FIG. 16, a user (e.g., a service provider) enters time during which services were performed into the mobile app (step 1602). The time may represent one or two shifts for a given day, which can be the current day or the previous day. Thereafter, a determination is made whether the time entry is for the last day of a given week (step 1604). As noted herein, processing of time sheets can vary in one or more implementations depending on a respective day in a given work week (which can be defined as any combination of days). If the determination at step 1604 is in the affirmative, then the process branches to step 1606 and the user computing device 104 configured by the mobile app receives signatures from service provider and service receiver (e.g., "Caregiver" and "Patient," respectively). Further, the process continues and the user computing device 104 configured by the mobile app captures and stores photographs (and/or other forms of input, such as audio content) of service provider and service receiver (step 1608). As digital signatures and photographs are captured, "raw" image information can be stored locally on the user computing device 104, along with a timestamp representing when each respective signature/photograph was captured. Thereafter, the user attempts to submit his/her timesheet, such as via the internet to information processor 102 (step 1610). Thereafter, a determination is made whether both signatures have been received (step 1612) and both photographs (step 1614). If not, then the process branches back to step 1610 (or, alternatively, step 1606, not shown), and the user tries again.

Continuing with reference to the example process flow 1600 shown in FIG. 16, at step 1616 a determination is made whether the service provider's photograph and the service receiver's photograph were captured within five (5) minutes of each other. This determination is based, at least in part, on information represented by the respective timestamps. Similarly, a determination is made whether service provider's signature and the service receiver's signature were captured within five (5) minutes of each other (step 1618). This determination is based, at least in part, on information represented by the respective timestamps. If so, then the process branches to step 1620 and a report is generated representing the timesheet and transmitted, for example, via the internet to information processor 102. In one or more implementations, the report can then be forwarded to another computing device (e.g., a separate information processor 102), which can be configured as part of another network, such as a home healthcare network.

Alternatively, if the determination in steps 1616 and/or 1618 is in the negative, then the process branches back to step 1610 (or, alternatively, step 1606, not shown), and the user tries again.

Alternatively, if the determination in step 1604 is in the negative (e.g., this is not the last timesheet for the week), then the process branches to step 1624 and the process continues and the user computing device 104 configured by the mobile app captures and stores signatures of service provider and service receiver (step 1608). As digital signatures are captured, "raw" image information can be stored locally on the user computing device 104, along with a timestamp representing when each respective signature/photograph was captured. Thereafter, the user attempts to submit his/her timesheet, such as via the internet to information processor 102 (step 1626). Thereafter, a determination is made whether both signatures have been received (step 1628). If not, then the process branches back to step 1626 (or, alternatively, step 1624, not shown), and the user tries again. If the determination in step 1628 is in the affirmative, then the process branches to steps 1620, and 1622.

The present application is now further described with reference to the example process flow 1700 shown in FIG. 17A. The example process flow 1700 represents steps associated with an example algorithm for reducing or eliminating tampering and fraud by configuring the user computing device 104 to access system-level functions to calculate respective time deltas between signatures and photographs (or other input).

Figure 17A:
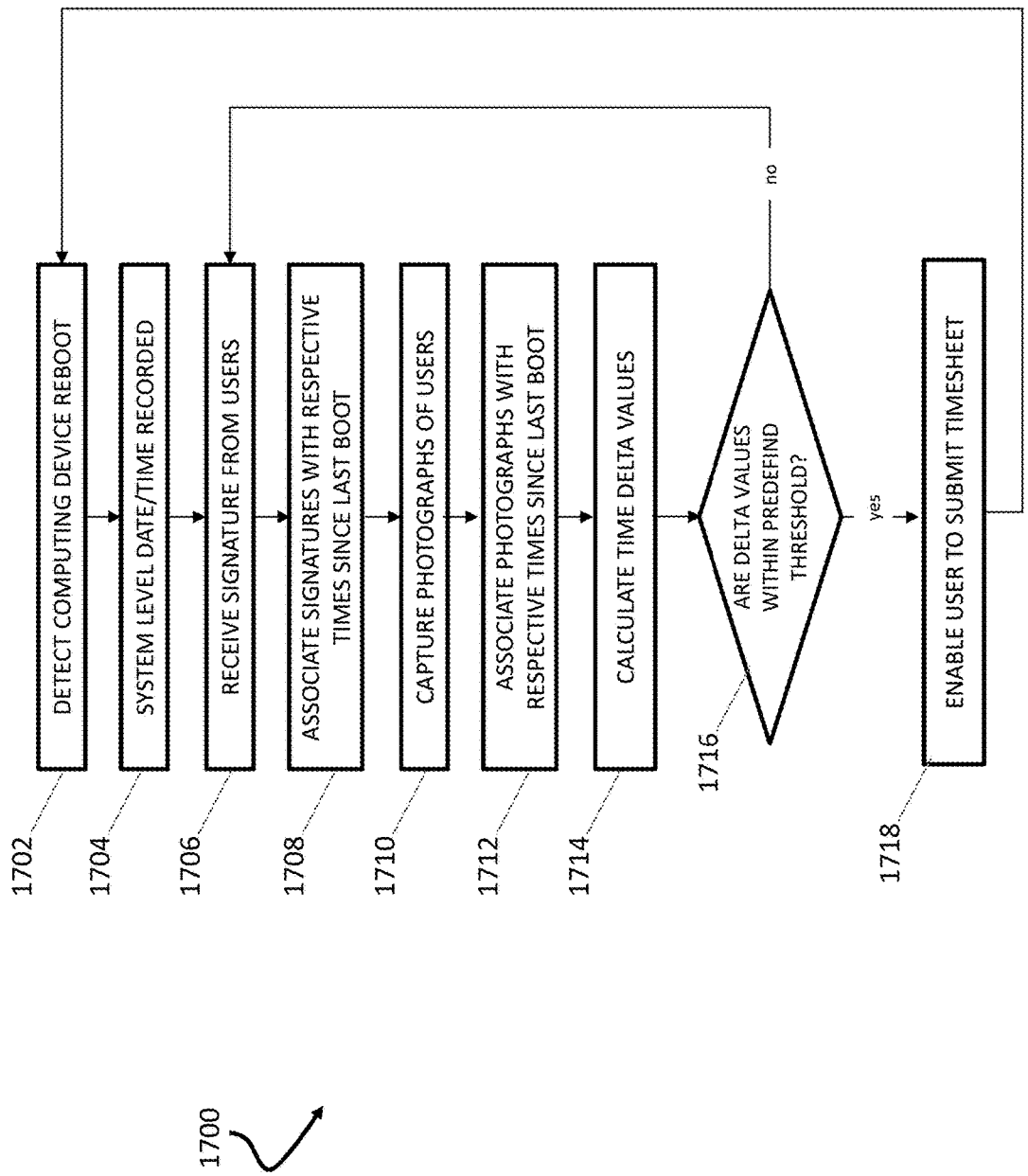
FIGS. 17A and 17B are flowcharts showing respective example processes in accordance with determining and acting on time delta values, in accordance with an implementation of the present application.

With continued reference to FIG. 17A, at step 1702 a determination is made that a system-level reboot occurred, which can include, for example, the user computing device being powered down and back up again. Thereafter, the user computing device 104 is configured, such as at the firmware and/or operating system level, to record the time of the reboot (step 1704). As users interact with the mobile app, signatures are received from the respective users, such as described above with reference to step 1606 (FIG. 16) (step 1706). A timestamp is used to associate each signature with a respective time, which represents the amount of time that has passed since the last reboot (for example, as recorded in step 1704) (step 1708). Moreover, as users continue to interact with the mobile app, photographs (and/or other user content) are received from the respective users, such as described above with reference to step 1608 (FIG. 16) (step 1710). A timestamp is used to associate each photograph with a respective time, which represents the amount of time that has passed since the last reboot (for example, as recorded in step 1704) (step 1712). Thereafter, delta values are calculated for the respective entries (step 1714). At step 1716, a determination is made whether the delta values are within a prescribed, predefined threshold, such as 5 minutes. If the determination is in the negative, then the process branches back to step 1706 and the signatures and photographs are reentered. Otherwise, the process branches to step 1718 and the user is authorized to submit the timesheet. Thereafter, the process returns to step 1702.

The present application is now further described with reference to the example process flow 1750 shown in FIG. 17B. The example process flow 1750 represents steps associated with another example algorithm for reducing or eliminating tampering and fraud by configuring the user computing device 104 to access system-level functions to calculate respective time deltas between signatures and photographs (or other input).

Figure 17B:
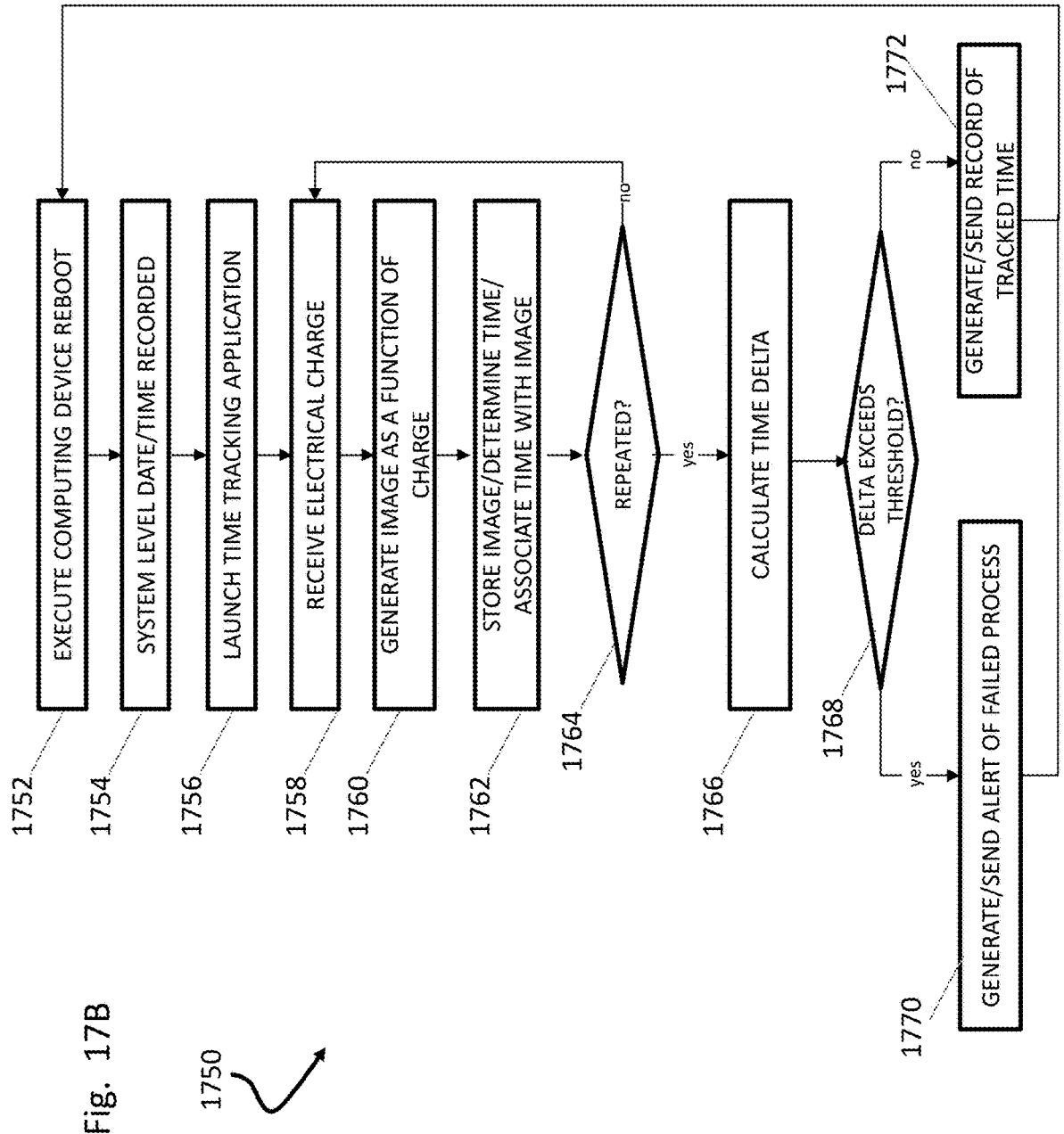

With continued reference to FIG. 17B, at step 1752 a computing device reboot is executed. Thereafter, a system level recordation is made of the date and/or time (step 1754). Thereafter, a tracking application, such as a time tracking application, is launched on the respective user computing device 104 (step 1756). In response to user activity, an electrical charge is received by the user computing device 104 (step 1758) and, thereafter, an image is generated as a function of the charge (step 1760). At step 1762, the image is stored, which includes determining a time of receiving the respective charge, and associating the time with the image. Thereafter, a determination is made whether the steps 1758-1762 have repeated and, if not, the process branches back to step 1758. Alternatively, the process branches to step 1766 and time delta values are calculated. A determination is made, thereafter, at step 1764 to determine whether the delta values exceed a predefined threshold (step 1768). If, so, then an alert representing a failed process is generated and transmitted (step 1770). Alternatively, a record of the tracked time is generated and transmitted (step 1772). Thereafter, the process returns to step 1752.

Features and example implementations of the present application are now further described.

As a user first interacts with an example mobile app, a login screen can be initially shown at startup. For example, a service provider enters a private 4 digit access code and password. One or more graphical screen controls, such as a check box, radio button, slider or other interface control can be used to reduce data entry steps, such as to remember the service provider's authorization codes after the service provider logs out.

At times when a user clocks in and out, the mobile app can configure the user computing device 104 to determine the user's location and compare that value with the service receiver's (e.g., patient's) address. The mobile app can include one or more modules that configure the user computing device 104 to ensure that location services (e.g., global positioning services ("GPS")) are enabled and, if not, the mobile app can display an error dialog and give the service provider an opportunity to enable location services. In one or more implementations, the mobile app precludes service providers from logging in until after location services are enabled.

After the user formally logs in (e.g., submitting proper authentication, enabling location services, and/or other like), a secure communication session between the user computing device 104 via the mobile app and an information processor 102, such as an exchange server, and the service provider's credentials are confirmed, such as a function of data on or accessible to the information processor 102. In case the service provider 102 is identified and authenticated, the user computing device 104 configured by the mobile app receives from the information processor 102 visit information for a predefined period of time, such as 12 weeks into the past and 2 weeks into the future. If the service provider is not recognized or authenticated, no visit information is accessed and returned. In one or more implementations, the mobile app is designed to not rely on much or even any locally stored data. Accordingly, the user computing device 104 accesses remote information, for example, during a login process, to properly perform its functions. For example, scheduling or other dynamic variables can change and the mobile app is not burdened with having to determine when to synchronize local and network data. Furthermore, this architecture allows the caregiver to use virtually any available configured device to submit time.

The following is a brief list of example data that are retrieved by the user computing device 104, such as via information processor 102, and an example order of steps in which the data are retrieved. During login, an exchange device (e.g., information processor 102) can requires a "caregiver id" to access caregiver data. In such case, the mobile app configures the user computing device to first "search" for the caregiver ID using a respective caregiver code. Once the caregiver code is mapped to the caregiver ID, the ID can be used for future data exchanges. In one or more implementations, the caregiver record can be retrieved to access a birth year for password comparison as well as the first and last name, address, phone, email and other data elements items used during various operations. Thereafter, the mobile app can query the exchange (e.g., information processor 102) for a list of all visits for a given caregiver between a start and end date. In one or more implementations, the query returns a list of visit IDs, so the app has to make an individual request for the visit details. While the mobile app configures the user computing device 104 to retrieve each visit record, a list of service receiver ID's (e.g., patient ID's) that match the visits is generated.

Retrieved information representing visit data can include scheduled start and end times, actual visit start and end times, receiver ID and tasks performed. After a plurality of visits are captured, the mobile app configures the user computing device 104 to retrieve information about each respective service receiver (e.g., patient). Information retrieved for patients is similar to caregivers but includes getting the coordinator email address to allow for emails to the coordinator. For any information that needs to accessed from a remote site, but not supplied by one or more respective information processors 102, the mobile app can configure the user computing device 104 to request respective configuration information from a separate server.

Figure 18:
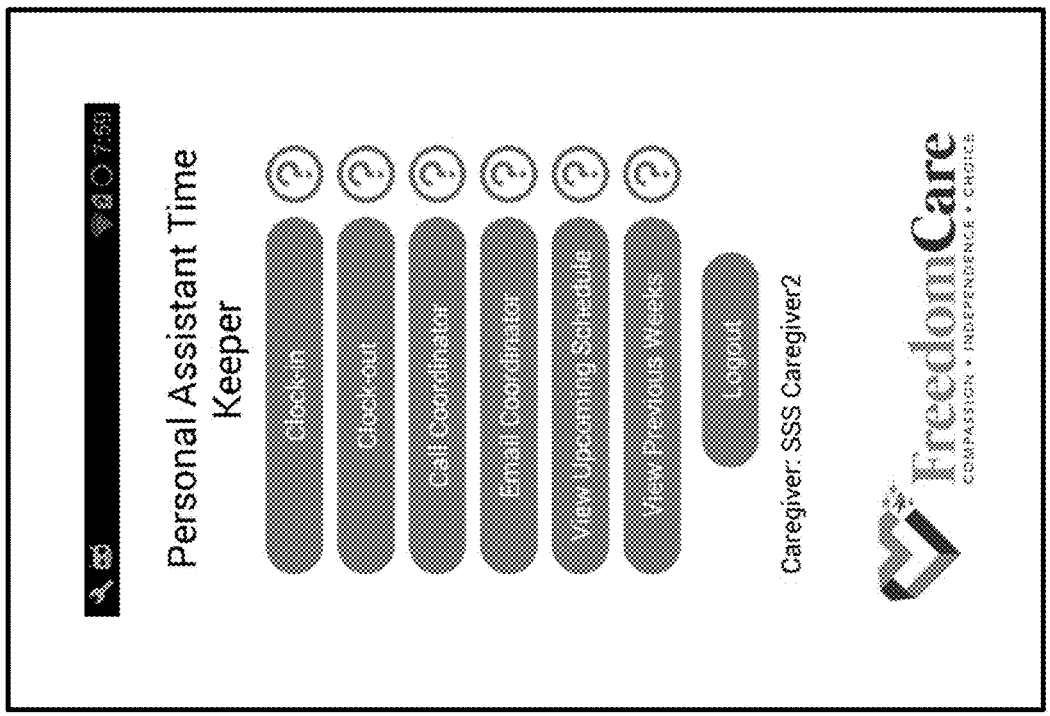
FIG. 18 is an example display screen in accordance with time-keeping functionality, in accordance with an example implementation.
Figure 19A:
FIGS. 19A-19E illustrate display screens and an example data entry interfaces associated with timesheets, in accordance with an example implementation of the present application.
Figure 19B:
Figure 19C:
Figure 19D:
Figure 19E:
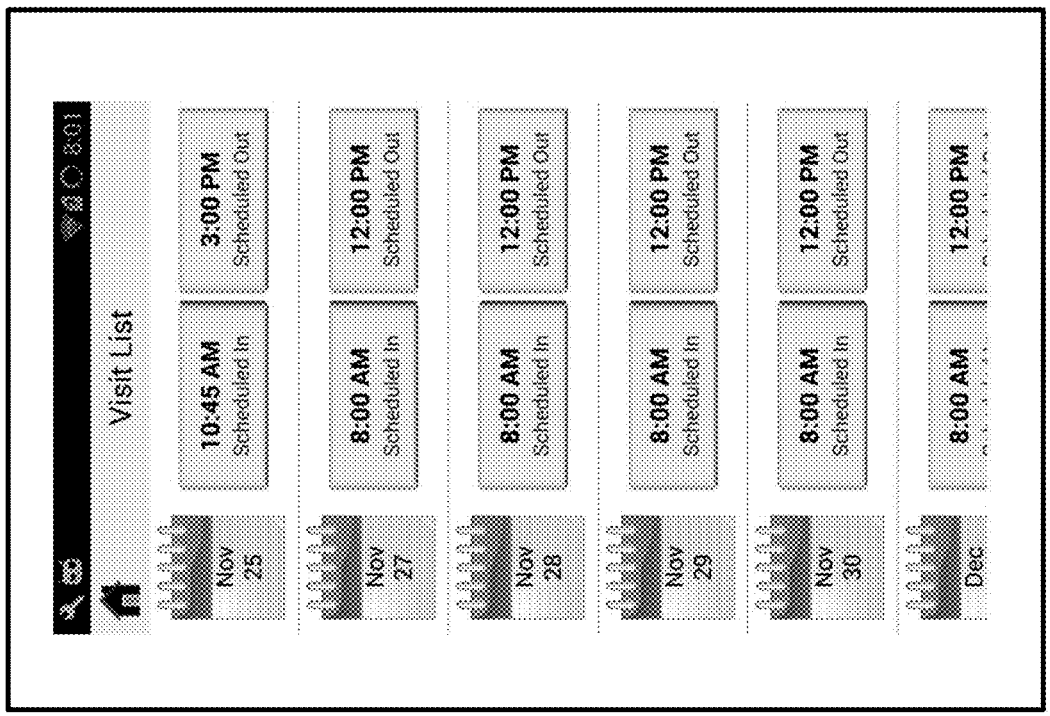

An example home screen is illustrated in FIG. 18, and is where many operations begin. In the example shown in FIG. 18, the large buttons begin the respective tasks and the "?" buttons next to each operation button displays help page showing brief instructional text on what that operations is. When the mobile app completes the login process and has successfully received data from a respective information processor 102, the mobile app determines if there are any visits in the past 12 weeks that have not been "confirmed" (in other words, one or more visits that have not been part of a clock out operation). If so, a dialog is displayed and the mobile app will immediately move to the Previous Week's List page when the dialog is acknowledged by the user.

With specific reference to FIG. 18, the Clock In function prompts the service provider to select a service receiver, and a visit for that service receiver that is scheduled for the same day. The app then "clocks in" the caregiver for that visit using the current time. The Clock Out function prompts the service provider to select a service receiver, and from a list of visits that are scheduled to end in the current day (both clocked in visits as well as visits not yet clocked in). The Call Coordinator option enables the mobile app to invoke a dialer app with a general phone number to connect to an exchange that will allow the service provider to reach an appropriate coordinator. The Email Coordinator option enables the mobile app to initially ask the service provider to select a service receiver, then invokes the default email app on the phone, filling in the email address with the coordinators address read from, for example, a data exchange. View Upcoming Visits: the app first asks the caregiver to select a patient, then lists all the upcoming visits found on the HHA exchange for that caregiver/patient pair. For more information, see section 2.9.

View Previous Weeks: the app displays a special list of patients that includes either a check mark icon or a "pulsing" warning icon. The caregiver selects a patient and is then shown a list of 12 past work weeks. This allows the caregiver to address unconfirmed visits in past weeks.

The action of "clocking in" to a visit is simple and similar to a normal "time clock." The caregiver first chooses which patient they are starting a shift for and then which visit they are clocking into. The visit list that is show will list only those visits for the selected patient that are scheduled to start sometime in the current day. Each row in the visit list is an independent scheduled visit with a start and end time which is shown in the row.

To complete the clock in action, the caregiver simply taps the visit they want to clock into. The app performs a "confirm visit" call to the HHA exchange and sets the visit start time to the current time. NOTE: since the HHA exchange does not allow a visit to be confirmed without both a start and end times, the visit end time is set to the start time+one minute. Later when the app re-reads visits, it will be able to distinguish a visit that is clocked in but not out by the visit times being only one minute apart.

As noted herein the mobile app is configured to compare a current location of a user with the address of the patient found in one or more databases. To do this, the app uses Geo-location service to convert a text address such as "123 Main Street Nowhere NY 12345" into a latitude and longitude pair. Note that the service used may be dependent on a respective user computing device 104 operating system. This geo-location is then compared to the latitude and longitude pair retrieved from the device's 104 location service and the difference is compared to the limit read from the server during login. If the distance is less than or equal to the limit, a "clock in GPS in range" value is saved with the confirm visit to the information processor 102. If greater than the limit, "clock in GPS out of range" is saved. If any location action fails, "clock in GPS unknown" is saved. This information can be later shown on the timesheet reports that are produced in accordance with the teachings herein.

In one or more implementations, there can be two types of timesheets: "single visit" and "weekly". The single visit timesheet can be used when clocking out of a visit that is not the last one for the work week. The weekly timesheet can be used when clocking out of the last visit for the work week or addressing unconfirmed visits from past weeks. The main differences between the two timesheet types are as follows:

Single visit timesheets show the start and end times of just one visit while the weekly timesheet will list all visits for the work week.

Single visit timesheets can require signatures from both patient and caregiver while weekly timesheets can require a signature and photo from both parties. As noted herein, both timesheet types require signatures to be taken from both the caregiver and the patient. The signature is captured by the user tapping the "Tap for Signature" area which brings up the following signature capture screen. The person can then use a finger or writing stylus to write a signature in the grey area of the page and then click Save to save it and go back to the timesheet page. The new signature will replace "Tap for Signature" image to show what was captured. While on the signature capture screen, the user can also tap the "Clear Signature" button to clear the capture area if the attempt does not produce the desired result.

On weekly timesheets, both the caregiver and patient must capture their photo as well.

FIGS. 19A-19E illustrate display screens 1900 associated with an example implementation of the present application. The respective screens shown in FIGS. 19A-19E an example data entry interface associated with timesheets. When a service provider has completed entering the visit information on the timesheet, and captured all required signatures and photos, the timesheet can be some, such as shown and described herein.

Figure 20:
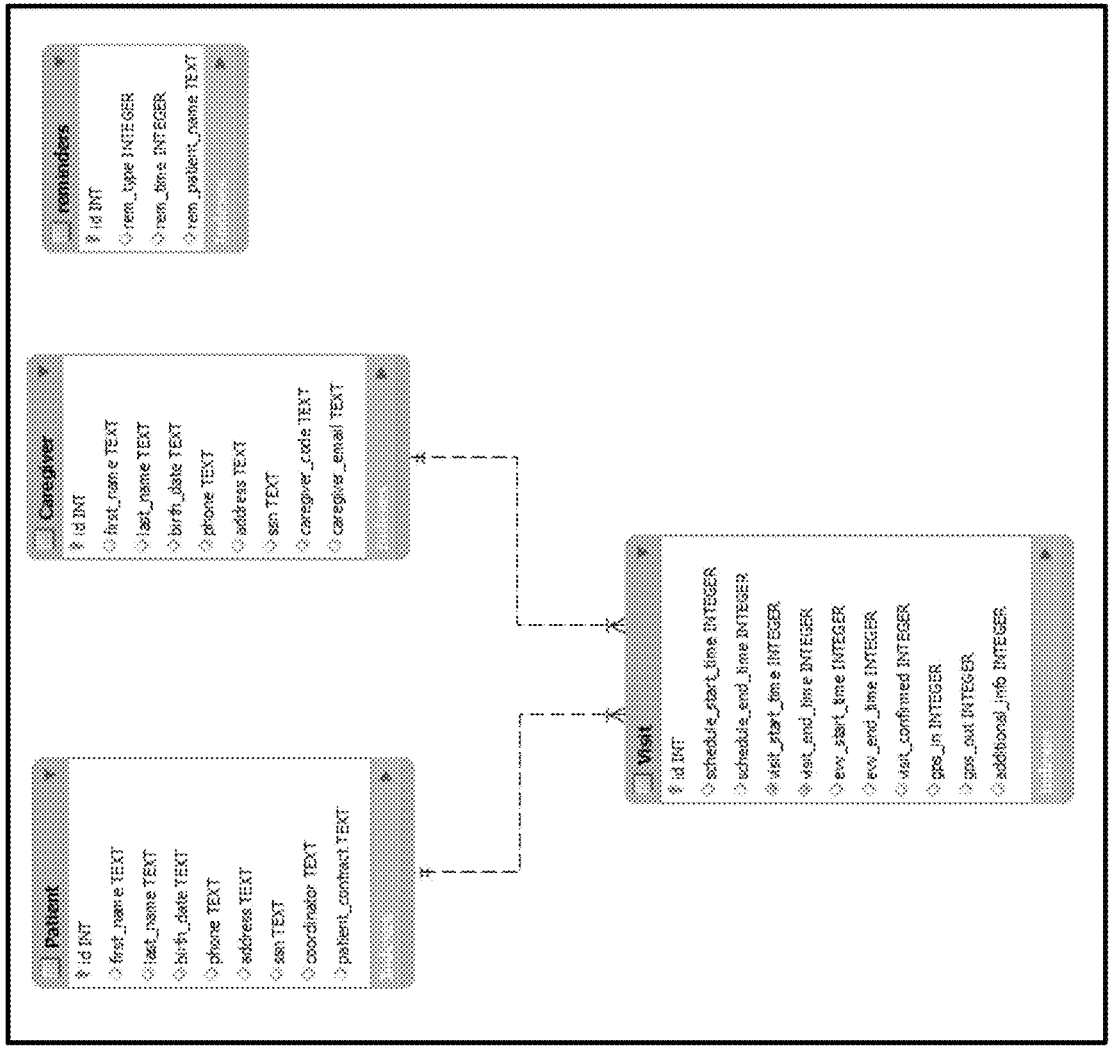
FIG. 20 is an example block diagram illustrating a record layout in connection with an example database implementation of the present application.

FIG. 20 is an example block diagram illustrating a record layout 2000 in connection with an example database implementation of the present application in connection with a patient data source, a caregiver data source, a visit data source and a reminder data source.

The systems and methods shown and described herein are unique in that they verify that the receiver of services (e.g., a patient) is physically present when his or her signature is captured, thereby confirming the hours actually worked by a service provider (e.g., a caregiver). This is accomplished, at least in part by linking the capture of the service receiver's signature with the capture of the service receiver's picture and linking the capture of the service provider's signature with the capture of the service provider's picture.

The mobile app confirms that the signatures and pictures are captured within a predefined period of time, such as 5 minutes, of each other and thereby enables identification of the person because one can be assured that the person whose picture was taken was actually present at the signing because of the proximity between the capture of those two items (picture and signature).

Although the present invention has been described in relation to particular embodiments thereof, many other variations and modifications and other uses will become apparent to those skilled in the art. It is preferred, therefore, that the present invention not be limited by the specific disclosure herein.

What is claimed:

1. A computer-based access security method, comprising:
a) executing a system-level boot process, by a processor configured with a computing device, as a function of at least boot code stored on non-transitory read only memory configured with the computing device;
b) storing, by the processor as a function of at least one operating system kernel, a value representing a time at or near completion of the system-level boot process;
c) launching, by the processor following completion of the system-level boot process and in response to a received instruction via one or more input devices configured with the computing device, an application for tracking time expended for services;
d) receiving, as a function of a capacitive touch screen, an electrical charge operable to cause a measurable drop in voltage;
e) generating, by the processor as a function of the measurable drop in voltage, an image that is displayed on a display screen configured with the computing device;
f) storing the image to processor readable media configured with the computing device, wherein storing the image includes:
determining a value representing an amount of time calculated from a time of completion of the system-level boot process;
associating the value representing the amount of time with the image;
g) repeating steps d), e) and f);
h) determining, by the processor as a function of code executing in the application, a delta value representing a difference in time between each of the values representing the amount of time calculated from the time of completion of the system-level boot process; and
i) where the delta between any two of the values representing the amount of time calculated from the time of completion exceeds a predefined threshold:
generating and transmitting an alert representing a failed process;
where the delta between any two of the values representing the amount of time calculated from the time of completion is within a predefined threshold; and
generating and transmitting a record representing at least the tracked time expended for the services.

2. The method of claim 1, wherein the step d) is generated by a first person and the repeated step d) is generated by a different person.

3. The method of claim 2, wherein the step e) image represents a respective signature from each of the two persons.

4. The method of claim 1, further comprising:
  detecting, as a function of the processor executing at least one instruction in the application, location services configured with the computing device, a geo-location;
  automatically transmitting to at least one other computing device, by the processor executing at least one instruction in the application, geo-location information representing the detected geo-location; and
  receiving from the at least one other computing device, in response to the transmitted geo-location information, a confirmation that the geo-location matches a stored location of a party to receive the services.

5. The method of claim 1, wherein the value representing the amount of time is associated as a function of metadata.

6. The method of claim 1, further comprising:
  j) causing, by the processor as a function of at least one received instruction in the application, a camera configured with the computing device to take a picture;
  k) storing the picture to processor readable media configured with the computing device, wherein storing the picture includes:
    determining a value representing an amount of time calculated from the time of completion of the system-level boot process;
    associating the value representing the amount of time with the picture;
  l) repeating steps h) and i);
  wherein the step i) includes the values set forth in steps k) and l).

7. The method of claim 6, wherein the steps j) and k) are performed upon a determination that tracking the time expended for services regards the last day of a predefined week.

8. The method of claim 6, wherein the picture taken in step j) is of a first person and the picture taken in the repeated step d) is of a different person.

9. The method of claim 8, wherein the first person is a service provider and the second person is a service receiver.

10. The method of claim 1, wherein the step f) and the repeated step f) of associating the value representing the amount of time with the image further comprises:
  altering image to include the value representing the amount of time.

11. A computer-based access security system, comprising at least one processor configured with a computing device, as a function of at least boot code stored on non-transitory read only memory configured with the computing device, wherein the processor is so configured to:
  a) execute a system-level boot process;
  b) store, as a function of at least one operating system kernel, a value representing a time at or near completion of the system-level boot process;
  c) launch, following completion of the system-level boot process and in response to a received instruction via one or more input devices configured with the computing device, an application for tracking time expended for services;
  d) receive, as a function of a capacitive touch screen, an electrical charge operable to cause a measurable drop in voltage;
  e) generate, as a function of the measurable drop in voltage, an image that is displayed on a display screen configured with the computing device;
  f) store the image to processor readable media configured with the computing device, which includes the processor being configured to:
    determine a value representing an amount of time calculated from a time of completion of the system-level boot process;
    associate the value representing the amount of time with the image;
  g) repeat d), e) and f);
  h) determine, as a function of code executing in the application, a delta value representing a difference in time between each of the values representing the amount of time calculated from the time of completion of the system-level boot process; and
  i) where the delta between any two of the values representing the amount of time calculated from the time of completion exceeds a predefined threshold:
    generate and transmit an alert representing a failed process;
  where the delta between any two of the values representing the amount of time calculated from the time of completion is within a predefined threshold; and
    generate and transmit a record representing at least the tracked time expended for the services.

12. The system of claim 11, wherein the step d) is generated by a first person and the repeated step d) is generated by a different person.

13. The system of claim 12, wherein the step e) image represents a respective signature from each of the two persons.

14. The system of claim 11, wherein the at least one processor is configured with a computing device to:
  detect, as a function of the processor executing at least one instruction in the application, location services configured with the computing device, a geo-location;
  automatically transmit to at least one other computing device, by the processor executing at least one instruction in the application, geo-location information representing the detected geo-location; and
  receive from the at least one other computing device, in response to the transmitted geo-location information, a confirmation that the geo-location matches a stored location of a party to receive the services.

15. The system of claim 11, wherein the value representing the amount of time is associated as a function of metadata.

16. The system of claim 11, wherein the at least one processor is configured with a computing device to:
  j) cause, by the processor as a function of at least one received instruction in the application, a camera configured with the computing device to take a picture;
  k) store the picture to processor readable media configured with the computing device, which includes:
    to determine a value representing an amount of time calculated from the time of completion of the system-level boot process;
    to associate the value representing the amount of time with the picture;
  l) repeat steps h) and i);
  wherein the step i) includes the values set forth in steps k) and l).

17. The system of claim 16, wherein the steps j) and k) are performed upon a determination that tracking the time expended for services regards the last day of a predefined week.

18. The system of claim 16, wherein the picture taken in step j) is of a first person and the picture taken in the repeated step d) is of a different person.

19. The system of claim 18, wherein the first person is a service provider and the second person is a service receiver.

20. The system of claim 11, wherein the step f) and the repeated step f) of associating the value representing the amount of time with the image further comprises:

altering image to include the value representing the amount of time.

\* \* \* \* \*